(12) United States Patent
Bauer

(10) Patent No.: US 10,814,290 B2
(45) Date of Patent: Oct. 27, 2020

(54) NANOBUBBLE-CONTAINING LIQUID SOLUTIONS

(71) Applicant: EBED Holdings Inc., Baden (CA)

(72) Inventor: Walter Jacob Bauer, Baden (CA)

(73) Assignee: EBED HOLDINGS INC., Baden, Ontario (CA)

( * ) Notice: Subject to any disclaimer, the term of this patent is extended or adjusted under 35 U.S.C. 154(b) by 303 days.

(21) Appl. No.: 15/025,971

(22) PCT Filed: Oct. 3, 2014

(86) PCT No.: PCT/CA2014/050957
§ 371 (c)(1),
(2) Date: Mar. 30, 2016

(87) PCT Pub. No.: WO2015/048904
PCT Pub. Date: Apr. 9, 2015

(65) Prior Publication Data
US 2016/0236158 A1 Aug. 18, 2016

Related U.S. Application Data

(60) Provisional application No. 61/886,318, filed on Oct. 3, 2013.

(51) Int. Cl.
*B01F 3/04* (2006.01)
*B01F 5/06* (2006.01)
(Continued)

(52) U.S. Cl.
CPC .......... *B01F 3/04106* (2013.01); *A01K 39/02* (2013.01); *B01F 5/0608* (2013.01);
(Continued)

(58) Field of Classification Search
None
See application file for complete search history.

(56) References Cited

U.S. PATENT DOCUMENTS 3,361,412 A 1/1968 Cole, III
3,762,550 A 10/1973 Jarr et al.
(Continued)

FOREIGN PATENT DOCUMENTS

CA 2696698 2/2009
JP 2008-516745 5/2008
(Continued)

OTHER PUBLICATIONS

European Patent Office, Extended European Search Report on European Patent Appln. No. 14850268.5, dated May 3, 2017.
(Continued)

*Primary Examiner* — Bradley R Spies
(74) *Attorney, Agent, or Firm* — Gowling WLG (Canada) LLP; Jeffrey W. Wong

(57) ABSTRACT

A nanobubble generator, a nanobubble-containing liquid solution comprising a substantially high concentration of nanobubbles, a system and methods of producing the nanobubble-containing liquid solution. The nanobubble generator includes an inflow portion for receiving a source liquid solution, a series of at least two sequential cavitation zones and shear planes to treat the source liquid solution and producing nano-bubble containing liquid solution, and an outflow portion for releasing the nanobubble-containing liquid solution.

14 Claims, 13 Drawing Sheets

(51) Int. Cl.
| | |
|---|---|
| *A01K 39/02* | (2006.01) |
| *B08B 3/08* | (2006.01) |
| *B08B 9/027* | (2006.01) |
| *C02F 1/48* | (2006.01) |
| *C02F 1/76* | (2006.01) |
| *C02F 101/10* | (2006.01) |
| *C02F 101/20* | (2006.01) |
| *C02F 101/30* | (2006.01) |
| *C02F 101/32* | (2006.01) |

(52) U.S. Cl.
CPC .............. *B01F 5/0669* (2013.01); *B08B 3/08* (2013.01); *B08B 9/027* (2013.01); *C02F 1/48* (2013.01); *C02F 1/76* (2013.01); *B01F 2003/04858* (2013.01); *B01F 2215/0052* (2013.01); *C02F 2101/101* (2013.01); *C02F 2101/203* (2013.01); *C02F 2101/206* (2013.01); *C02F 2101/30* (2013.01); *C02F 2101/32* (2013.01); *C02F 2307/06* (2013.01)

(56) References Cited

U.S. PATENT DOCUMENTS

| | | | |
|---|---|---|---|
| 3,933,606 A | 1/1976 | Harms | |
| 3,941,355 A | 3/1976 | Simpson | |
| 4,342,730 A | 8/1982 | Perotta | |
| 4,387,026 A | 6/1983 | Woolacott | |
| 4,772,369 A | 9/1988 | Mercier et al. | |
| 4,808,287 A | 2/1989 | Hark | |
| 4,954,263 A | 9/1990 | Woodhouse | |
| 5,246,586 A | 9/1993 | Ban et al. | |
| 5,492,654 A * | 2/1996 | Kozjuk .................. | B01F 5/061 261/76 |
| 5,591,317 A | 1/1997 | Pitts, Jr. | |
| 5,620,597 A | 4/1997 | Andelman | |
| 5,695,644 A | 12/1997 | Buchanan | |
| 5,817,224 A | 10/1998 | Pitts, Jr. | |
| 5,866,018 A | 2/1999 | Hyde et al. | |
| 5,906,800 A | 5/1999 | Napierkowski | |
| 5,951,856 A | 9/1999 | Cho | |
| 5,997,812 A | 12/1999 | Burnham | |
| 6,241,375 B1 * | 6/2001 | Wang ................... | B29C 47/0825 366/82 |
| 6,368,849 B1 | 4/2002 | Norddahl | |
| 6,416,668 B1 | 7/2002 | Al-Samadi | |
| 6,679,988 B2 | 1/2004 | Gsell | |
| 6,689,270 B1 | 2/2004 | Evert | |
| 6,849,178 B2 | 2/2005 | Hecking | |
| 7,547,413 B2 | 6/2009 | Bauer | |
| 7,906,025 B2 | 3/2011 | Bauer | |
| 8,454,837 B2 | 6/2013 | Bauer | |
| 2001/0035342 A1 | 11/2001 | Morse et al. | |
| 2002/0162801 A1 | 11/2002 | Sawada | |
| 2003/0234219 A1 | 12/2003 | Verma | |
| 2006/0050608 A1 | 3/2006 | Kozyuk | |
| 2007/0278161 A1 * | 12/2007 | Shepherd ................ | C02F 1/66 210/764 |
| 2008/0029462 A1 * | 2/2008 | Huymann ................ | C02F 1/34 210/748.01 |
| 2008/0056065 A1 * | 3/2008 | Keller .................... | B01F 5/0612 366/339 |
| 2009/0273103 A1 | 11/2009 | Watanabe | |
| 2010/0089133 A1 | 4/2010 | Yamasaki et al. | |
| 2010/0101978 A1 | 4/2010 | Gordon et al. | |
| 2011/0215055 A1 * | 9/2011 | Baron ................... | B01F 5/0615 210/748.1 |
| 2012/0063992 A1 | 3/2012 | Sachweh et al. | |

FOREIGN PATENT DOCUMENTS

| | | |
|---|---|---|
| JP | 2008-188502 | 8/2008 |
| JP | 2010107060 A | 5/2010 |
| JP | 2012-236151 | 12/2012 |
| JP | 2012236151 | 12/2012 |
| SG | 2013047410 | 1/2015 |
| WO | 2005115088 | 12/2005 |
| WO | 2006039827 | 4/2006 |

OTHER PUBLICATIONS

Intellectual Property Office of Singapore, Written Opinion on Singapore Patent App. No. 11201601544V, dated Feb. 20, 2017.
State Intellectual Property Office of China, Office Action on Chinese Patent Appln. No. 201480053733.X, dated Jul. 14, 2017.
Gowling WLG, English Summary of Office Action on Chinese Patent Appln. No. 201480053733.X, dated Aug. 24, 2017, pp. 1-2, Beijing, China.
Canadian Intellectual Property Office as International Searching Authority, International Search Report and Written Opinion for PCT/CA2014/050957, dated Dec. 30, 2014.
IP Australia, Office Action on Australian Patent Appln. No. 2014331497, dated Mar. 14, 2018.
Official Action on corresponding RU patent application No. 2016109447, dated Apr. 18, 2018.
Official Action on corresponding EP patent application No. 14850268.5, dated Jun. 8, 2018.
Official Action on corresponding JP patent application No. 2016-546128, dated Jul. 3, 2018.
Official Action on corresponding CN patent application No. 201480053733.X, dated Aug. 7, 2018.
Gowling WLG, English Summary of Official Action on corresponding CN patent application No. 201480053733.X, dated Aug. 7, 2018.
Official Action on corresponding AU patent application No. 2014331497, dated Oct. 16, 2018.
Official Action on corresponding CN patent application No. 201480053733.X, dated Jun. 17, 2019.
English Summary of Official Action dated Jun. 17, 2019 on corresponding CN patent application No. 201480053733.X.
Official Action on corresponding MX patent application No. MX/a/2016/003652, dated Jul. 9, 2019.
English Summary of Official Action dated Jul. 9, 2019 on corresponding MX patent application No. MX/a/2016/003652.
Official Action on corresponding IL patent application No. 244386, dated Jul. 15, 2019.
Official Action on corresponding AU patent application No. 2019201646, dated Oct. 31, 2019.
Official Action on corresponding BR patent application No. 112016006226-4, dated Dec. 3, 2019.
English Summary of Official Action dated Dec. 3, 2019 on corresponding BR patent application No. 112016006226-4.
Official Action on corresponding NZ patent application No. 717593, dated Dec. 3, 2019.
Official Action on corresponding MX patent application No. MX/a/2016/003652, dated Dec. 6, 2019.
English Summary of Official Action dated Dec. 6, 2019 on corresponding MX patent application No. MX/a/2016/003652.
Espacenet, English translation of Abstract of JP2010107060A, retrieved Jan. 20, 2020.

* cited by examiner

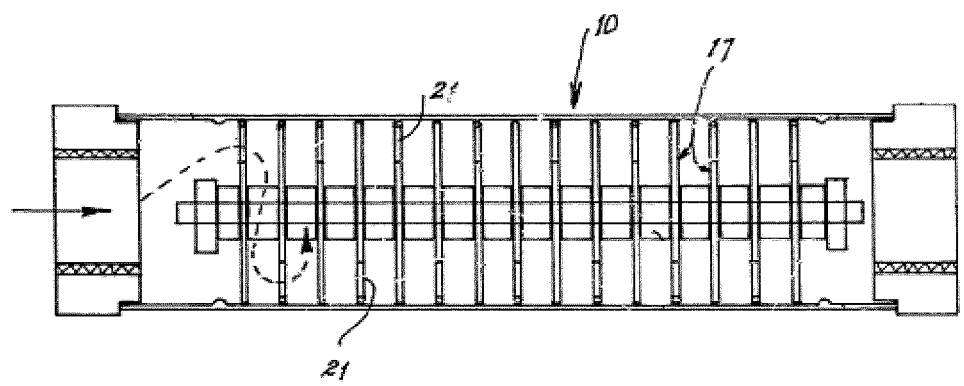
FIG. 1 – PRIOR ART
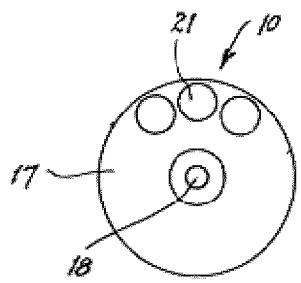
FIG. 2 – PRIOR ART

Control Water          Nanobubble-
treated Water

NANOBUBBLE-CONTAINING LIQUID SOLUTIONS

CROSS REFERENCE TO RELATED APPLICATIONS

This application claims priority of U.S. Provisional Ser. No. 61/886,318, filed Oct. 3, 2013, the contents of which are hereby incorporated by reference into the present disclosure.

FIELD OF THE INVENTION

The present invention relates to liquid solutions having nanobubbles and to a system and a method of producing nanobubble-containing liquid solutions.

BACKGROUND OF THE INVENTION

In recent years, gas-liquid mixture fluid containing fine bubbles (millimeter, micrometer and nanometer size bubbles) are being used in various industries and fields of applications.

Micro-nanobubble generators currently in the market require air or a gas to produce fine bubbles and cannot efficiently reduce the size of the bubble to having a particle size of a nanometer.

Many generators can only produce nanobubbles through micro-bubbles and utilize a swirling fluid chamber with a single shearing point, injector or Venturi to reduce the size of the bubble. Other systems utilize Pressurized Dissolution or Electrolysis to create nanobubbles. All of these systems are not capable of creating the endothermic reaction required to make the fluids paramagnetic.

U.S. Pat. No. 8,317,165, for example, describes a nanobubble-containing liquid producing apparatus However, the apparatus of described in this U.S. patent can only produce nanobubbles from a microbubble base fluid and needs to utilize external gas/air to create a greater abundance of nanobubbles.

Therefore, one object of the present invention is to provide systems and methods of producing nanobubble-containing liquid solutions that overcome the disadvantages of the prior art. An object of the present invention is to provide systems and method of producing nanobubble-containing liquid solutions that do not require, for example, air or gas to produce the nanobubbles, or that do not require a microbubble base solution.

Further on other objects of the invention will be realized from the following Summary of the Invention, the Discussion of the Invention and the embodiments and Examples thereof.

SUMMARY OF THE INVENTION

Within the present invention, solutions having nanobubbles are provided as well as nanobubble generators and systems and methods enabling the generation of said solutions. The systems and methods of the present invention systems and method of producing nanobubble-containing liquid solutions do not require external air or gas to produce nanobubbles or to create a greater abundance of nanobubbles, and they do not require a nanobubble or microbubble base solution.

The nanobubble generator of the present invention, in one embodiment, includes comprises a chamber having a series of at least two sequential cavitation zones and shear surface planes. The source liquid solution includes polar liquid solutions, non-polar liquid solutions or a combination thereof. The treated liquid solution is then distributed for use and/or consumption.

In one embodiment, the nanobubble generator includes a housing having an inflow portion for receiving a source liquid solution, an outflow portion for releasing a nanobubble containing liquid solution, and a treatment portion for treating the source liquid solution, the treatment portion having at least two sequential shear surface planes separated by cavitation spaces, chambers or zones.

In another embodiment of the nanobubble generator the treatment portion includes at least two disc-like elements mounted on a shaft extending axially through the housing, the disc-like elements being separated by a space.

In another embodiment of the nanobubble generator of the present invention, the width of each shear surface plane is about one half the width of each cavitation space. In one embodiment of the present invention, the width of each disc-like element is about one half the distance between two consecutive shear planes or less.

In another embodiment of the nanobubble generator of the present invention, each disc-like element includes a first wall facing the inflow portion, a second wall facing the outflow portion and a peripheral wall extending between the first and second walls, and wherein the peripheral wall includes a notch or groove.

In another embodiment of the nanobubble generator of the present invention, the disc-like elements are mounted along the shaft with their notches circumferentially staggered in relation to one another.

In another embodiment of the nanobubble generator of the present invention, the nanobubble generator includes between 2 and 30 disc-like elements.

In another embodiment of the nanobubble generator of the present invention, the disc-like elements are made of a metal or a combination of metals. In one embodiment, the disc-like elements are made of stainless-steel.

In one embodiment, the present invention relates to a nanobubble-containing liquid solution generation system having a liquid solution source and a nanobubble generator of any of the previous embodiments, the source solution inflow portion of the nanobubble generator operatively connected to the liquid solution source.

In another embodiment, the present invention relates to a nanobubble-containing liquid solution producing method. In one embodiment, the method includes passing a source liquid solution through a nanobubble generator of the present invention thereby producing the nanobubble-containing liquid solution.

In another embodiment of the nanobubble-containing solution producing method of the present invention, the source liquid includes a mixture of a liquid and a gas.

The source liquid solution is treated by passage through the nanobubble generator to produce nanobubbles in the source liquid solution. The nanobubbles are preferably present in a relatively high concentration in the treated solution and are small, preferably in the nano-size range, preferably having between about 10 and about 2000 nanometers, more preferably between about 10 nm and about 150 nm.

In one embodiment of the present invention, the liquid solution is optionally passed, before or after the nanobubble generator, through at least one filtration system, whereby bacteria, viruses, cysts, and the like are substantially removed from the treated liquid. Any filtration systems known in the art may be used and incorporated in the inventive system. Filtration systems may include, but are not limited to, particle filters, charcoal filters, reverse osmosis filters, active carbon filters, ceramic carbon filters, distiller filters, ionized filters, ion exchange filters, ultraviolet filters, back flush filters, magnetic filters, energetic filters, vortex filters, chemical oxidation filters, chemical additive filters, Pi water filters, resin filters, membrane disc filters, microfiltration membrane filters, cellulose nitrate membrane filters, screen filters, sieve filters, or microporous filters, and combinations thereof. Given that the nanobubbles have a relatively long life, the nanobubble-containing solutions of the present invention may be stored or distributed for use and consumption.

In another embodiment of the present invention, the treated source liquid, is optionally passed through a mineral filtration system, whereby minerals, such as iron, sulfur, manganese, and the like, are substantially removed from the treated source liquid.

The filtration(s) of the liquid solution may be done at any time or step. For example, the filtration may be done to the source liquid solution, or to the nanobubble-containing liquid solution.

In yet another embodiment of the present invention, the source liquid is treated by a first nanobubble generator. The treated liquid is optionally passed through the optional mineral-filtration system and the optional at least one pathogen filtration system. The nanobubble-containing solution may be distributed stored in a storage container, such as a reservoir, or re-treated. Before distribution of the nanobubble-containing solution, the treated solution is optionally passed through additional one or more nanobubble generators, whereby additional nanobubbles are generated. The twice, trice and so forth nano-bubble generator treated solution is then distributed for use and consumption.

Source liquid solution treated and optionally filtered by the inventive system is effective in substantially destroying or reducing growth of cells, pathogens, viruses, bacteria, fungi, spores, and molds, as well as enhancing the overall quality of the source liquids. The nanobubble generator may be integrated with various liquid systems to treat many types of source liquid. These liquid systems may include water heaters, water coolers, potable water systems, water sanitation systems, water softeners, ion exchangers, and the like. Liquid systems incorporating a nanobubble generator can be utilized among the common household, as well as the scientific, food processing, petroleum, solvents, and medical industries.

As such, in another embodiment, the present invention provides for a method of enhancing the qualities of a material. The method, in one embodiment, includes: (a) passing a source liquid solution through the nanobubble generator of the present invention, thereby producing a liquid solution comprising nanobubbles; and (b) contacting the material with the nanobubble-containing solution.

In another embodiment, the present invention relates to a method of removing or preventing the formation of biofilm on a surface. The method, in one embodiment, includes: (a) passing a source liquid solution through the nanobubble generator of the present invention, thereby producing a liquid solution comprising a nanobubbles; and (b) contacting the surface with the nanobubble-containing solution.

In yet another embodiment, the present invention is a method of reducing the content of ammonia in manure of birds. This method, in one embodiment, includes: providing the birds with a nanobubble-containing liquid solution.

In one embodiment of the method of reducing the content of ammonia in manure of birds, the liquid solution is obtained by passing a source liquid solution through the nanobubble generator of the present invention, thereby producing the liquid solution including nanobubbles.

In another embodiment, the present invention relates to a method of removing heavy metals from a material. The method, in one embodiment, includes: (a) passing a source liquid solution through the nanobubble generator of the present invention, thereby producing a nanobubble-containing liquid solution; and (b) contacting the material with the nanobubbles-containing liquid solution.

The nanobubble-containing solutions of the present invention include bubbles having a mean particle size of a nanometer between about 10 to 2000 nm. Unlike the fine bubble-containing liquids of the prior art, the nanobubble-containing liquid solutions of the present invention are stable and have paramagnetic properties. The nanobubble-containing solutions of the present invention includes an oxidation-reduction potential (ORP) which is relatively higher than the source liquid used to generate the nanobubble-containing solution of the present invention. The nanobubbles-containing solutions of the present invention are stable and can be present in the solution for substantial long periods of time.

As such, in one embodiment, the present invention provides for a nanobubble-containing liquid solution, the nanobubbles in the liquid solution having a particle size of about 10 to 2000 nm. In one aspect of the present invention, the nanobubbles of the nanobubble-containing liquid solution of the present invention are stable. In another aspect of the present invention, the nanobubble-containing liquid solution is paramagnetic. In another aspect of the nanobubble-containing liquid solution, the nanobubble-containing liquid solution has an ORP which is relatively higher than the ORP of the source liquid solution used to generate the nanobubble-containing solution. In the case of water, in one embodiment of the present invention, water treated with the nanobubble generator of the present invention has an ORP of about 650 mV or higher.

In another embodiment of the nanobubble-containing liquid solution of the present invention, the liquid solution is selected from a non-polar liquid solution, a polar liquid solution or a combination thereof.

In aspects of the nanobubble-containing solution of the present invention, the liquid of the solution is selected from the group consisting of: water (tap water, municipal water, well water, wastewater, and the like), a solvent, fuels, edible oils, non-edible oils, and alcohols.

In another embodiment of the nanobubble-containing solution of the present invention, the solution comprises a mixture of a liquid and a gas. In aspects of the nanobubble-containing solution of the present invention, the gas component of the mixture is selected from the group consisting of: nitrogen, oxygen, carbon dioxide, ozone, ethanol, methanol and hydrogen.

In one embodiment, the nanobubbles of the nanobubble-containing liquid solution of the present invention are sized between about 10 and about 2000 nanometers. In another embodiment the nanobubbles of the nanobubble-containing liquid solutions of present invention are sized between about 10-1000 nm. In another embodiment the nanobubbles of the nanobubble-containing liquid solutions of present invention are sized between about 10-900 nm. In another embodiment the nanobubbles of the nanobubble-containing liquid solutions of present invention are sized between about 10-850 nm. In another embodiment the nanobubbles of the nanobubble-containing liquid solutions of present invention are sized between about 10-800 nm. In another embodiment the nanobubbles of the nanobubble-containing liquid solutions of present invention are sized between about 10-750 nm. In another embodiment the nanobubbles of the nanobubble-containing liquid solutions of present invention are sized between about 10-700 nm. In another embodiment the nanobubbles of the nanobubble-containing liquid solutions of present invention are sized between about 10-650 nm. In another embodiment the nanobubbles of the nanobubble-containing liquid solutions of present invention are sized between about 10-600 nm. In another embodiment the nanobubbles of the nanobubble-containing liquid solutions of present invention are sized between about 10-550 nm. In another embodiment the nanobubbles of the nanobubble-containing liquid solutions of present invention are sized between about 10-500 nm. In another embodiment the nanobubbles of the nanobubble-containing liquid solutions of present invention are sized between about 10-450 nm; between about 10-400 nm. In another embodiment the nanobubbles of the nanobubble-containing liquid solutions of present invention are sized between about 10-350 nm. In another embodiment the nanobubbles of the nanobubble-containing liquid solutions of present invention are sized between about 10-300 nm; between about 10-250 nm. In another embodiment the nanobubbles of the nanobubble-containing liquid solutions of present invention are sized between about 10-200 nm. In another embodiment the nanobubbles of the nanobubble-containing liquid solutions of present invention are sized between about 10-150 nm. In another embodiment the nanobubbles of the nanobubble-containing liquid solutions of present invention are sized between about 10-100 nm. In another embodiment the nanobubbles of the nanobubble-containing liquid solutions of present invention are sized between about 10-90 nm or between about 10-80 nm. In another embodiment the nanobubbles of the nanobubble-containing liquid solutions of present invention are sized between about 10-70 nm. In another embodiment the nanobubbles of the nanobubble-containing liquid solutions of present invention are sized between about 10-60 nm. In another embodiment the nanobubbles of the nanobubble-containing liquid solutions of present invention are sized between about 10-50 nm. In another embodiment the nanobubbles of the nanobubble-containing liquid solutions of present invention are sized between about 10-40 nm. In another embodiment the nanobubbles of the nanobubble-containing liquid solutions of present invention are sized between about 10-30 nm; and between about 10-20 nm.

In another embodiment the nanobubble-containing liquid solutions of present invention include between about 1.13 E8 nanobubbles/ml to about 5.14 E8 nanobubbles/ml.

In another embodiment the nanobubble-containing liquid solutions of present invention nanobubbles having a mean particle size between about 70 nm and 190 nm. In another embodiment the nanobubble-containing liquid solutions of present invention nanobubbles having a mode particle size between about 45 nm and 85 nm.

In one embodiment, the nanobubbles of the nanobubble-containing liquid solutions of present invention have a mean size of under about 100 nm. In another embodiment, the nanobubbles of the nanobubble-containing liquid solutions of present invention have a mean size of under about 75 nm.

In one embodiment, the nanobubbles of the nanobubble-containing liquid solutions of present invention have a mode size of under about 60 nm. In another embodiment, the nanobubbles of the nanobubble-containing liquid solutions of present invention have a mean size of under about 50 nm.

In one embodiment of the present invention, the source liquid solution used in the nanobubble generators, systems and methods of any one of the above applicable embodiments is devoid of gases.

In another embodiment of the present invention, the source liquid solution used in the nanobubble generators, systems and methods of any one of the above applicable embodiments is devoid of the use of external gases.

In another embodiment of the present invention, the source liquid solution used in the nanobubble generators, systems and methods of any one of the above applicable embodiments is devoid of micro or nano-bubbles.

BRIEF DESCRIPTION OF THE DRAWINGS

The following figures illustrate various aspects and preferred and alternative embodiments of the invention.

FIG. 1. Side view of a water conditioner device of the prior art.

FIG. 2. Graph illustrating a disc of the device of FIG. 1.

DESCRIPTION OF THE INVENTION

Definitions

Figure 3:
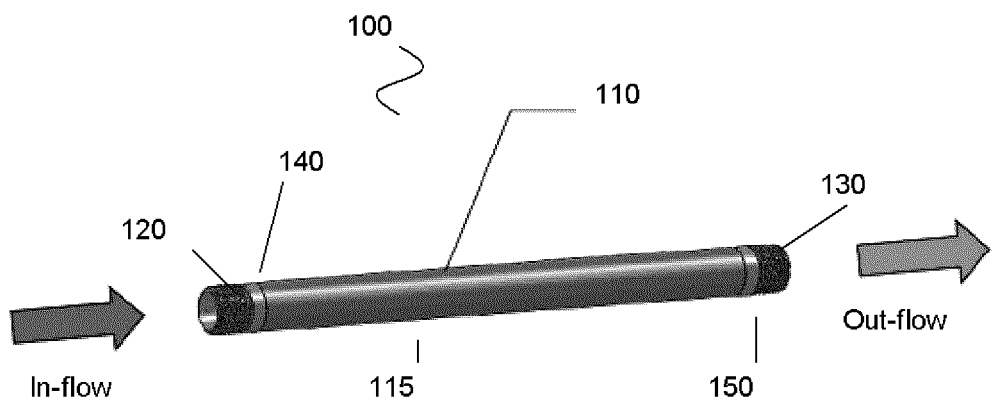
FIG. 3. Perspective view of a nanobubble generator according to one embodiment of the present invention.
Figure 4:
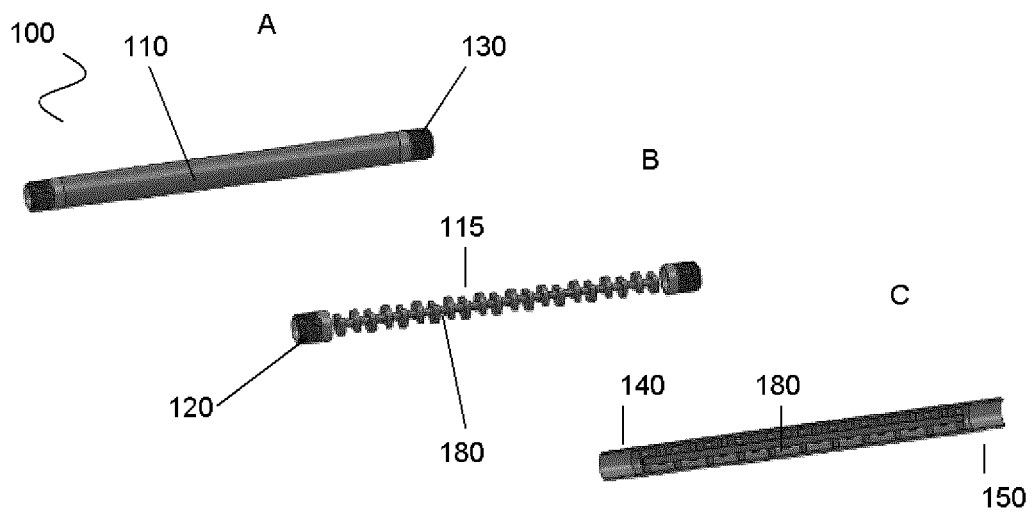
FIG. 4. Full, outer view (A), transparent view (B) and longitudinal cross sectional view (C) of the nanobubble generator of FIG. 3.

Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "containing", "including", "having" and "comprising" typically indicate "including without limitation"). Examples of limiting terms include "consisting of" and "consisting essentially of". Singular forms including in the claims such as "a", "an" and "the" include the plural reference unless expressly stated otherwise.

In order to aid in the understanding and preparation of the within invention, the following illustrative, non-limiting, examples are provided.

a. Overview

The inventive system and method of the present invention effectively produces nanobubbles in a source of liquid material without changing the elemental composition of the source liquid material and without requiring the use of catalysts toxic or harmful additives. The system and process may be implemented in a stationary, installed unit, or in a portable unit. The inventive system may also be retrofitted in existing liquid solution distribution systems, such as water distribution systems. Although several specific embodiments are described, it will be apparent that the invention is not limited to the embodiments illustrated, and that additional embodiments may also be used. The nanobubble-containing liquid solution of the present invention is highly effective in a variety of application as it will be described herein below. The generators, systems and methods of the present invention do not require external air or gas to produce nanobubbles or to create a greater abundance of nanobubbles in a source liquid solution, and they do not require a nanobubble or microbubble base liquid solution.

b. Nanobubble Generator

With reference to FIGS. 3-8, the nanobubble of the present invention may include a housing 110 having an inflow portion 140 for receiving the source liquid solution, an out-flow portion 150 for releasing the nanobubble-containing liquid solution, and a treatment portion 115 between the inflow 140 and outflow 150 for treating the source liquid solution.

With reference to FIGS. 3 and 4A, the housing 110 may take a substantially tubular form. The inlet 140 and outflow 150 portions may include a threaded boss 120 and 130 at each end. The housing 110 and bosses 120 and 130 are preferably made of a substantially inert material, such as polyvinyl chloride (pvc).

Figure 8:
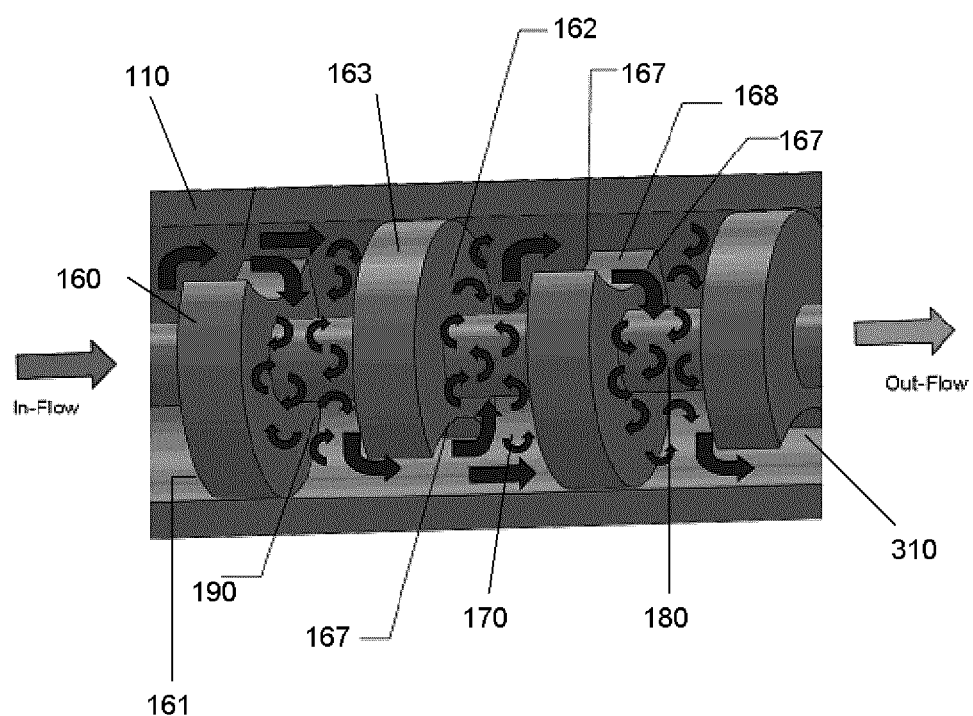
FIG. 8. Enlarged view of a longitudinal cross section of the nanobubble generator of FIG. 3 showing the flow of a liquid solution through the nanobubble generator.

With reference to FIGS. 4B and 4C, 5, 6 and 8 the treatment portion 115 of the nanobubble generator may include a series of sequential cavitation zones 190 and shear surface planes 168. The series of sequential cavitation zones 190 and shear surface planes 168 may be enabled by having a generally elongated member 180 having a series (2 or more) of spaced apart elements 160 which extend axially through the housing 110 and may be interposed between the inflow and the outflow portions of the nanobubble generator. Between 2 and 30 spaced apart elements 160 may be used. More than 30 spaced apart elements 160 may also be used. Each element 160 may take the form of a disc. The disc-like elements 160 may be supported upon or mounted on a central rod or shaft 180. With reference to FIG. 8, the disc 160 may include opposite walls 161, 162 (also referred to as shear walls), and a peripheral or side wall 163. One shear wall 161 may face the inflow portion and the opposite shear wall 162 may face the outflow portion of the generator. The peripheral wall 163 may extend between opposite shear walls 161, 162. The disc-like elements 160 may be held in spaced relation to each other. The elements 160 may be separated from one another by a space 170.

Figure 5:
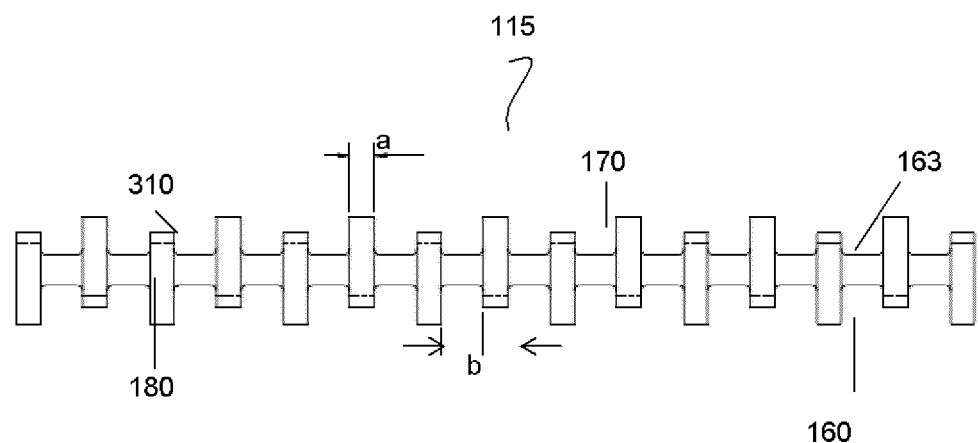
FIG. 5. Graph illustrating a side view of a treatment portion of a nanobubble generator according to one embodiment of the present invention.

As illustrated in FIGS. 5-8 each element 160 may be formed with at least one groove or notch 310 extending downwards from the peripheral wall 163. Each groove or notch 310 may include edges or shear edges 167 and a shear surface plane 168 between the shear edges 167. The shear surface plane 168 may be viewed as a continuation of the peripheral walls 163 into the grooves 310. The edges 167, which may have a scallop design, may be substantially sharp. Preferably the disc-like elements may be made laser cut. As illustrated in FIG. 5, the width "a" of each disc-like element 160, and therefore the width of the shear plane surface, is about one half the distance "b" between two consecutive disc-like elements 160.

Figure 6:
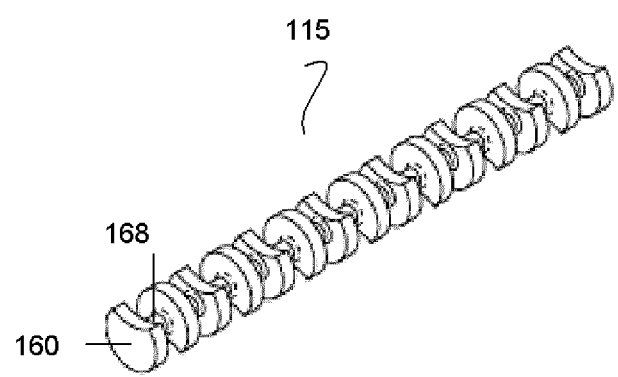
FIG. 6. Graph illustrating an isometric view of the treatment portion of the nanobubble generator of FIG. 3
Figure 7:
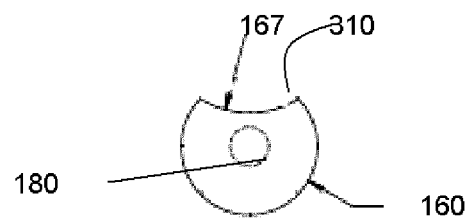
FIG. 7. Graph illustrating a front view of a disc-like element of the nanobubble generator, according to one embodiment of the present invention.

As illustrated in FIGS. 5, 6 and 8, the axially successive discs 160 are arranged along the rod 180 with their notches or grooves circumferentially staggered in relation to one another. The elements 160 may be arranged on rod 180 such that the notches 310 in each element 160 is alternating. That is, if a notch in one disc-like element is facing down, the notches in the following disc-like element would be facing up.

The disc-like elements may be manufactured from a single metal. Preferably the disc-like elements may be made of a corrosion resistant metal. Preferably, the disc-like elements may be made from stainless steel 300 series, such as 316L. Preferably the discs are laser cut.

As shown in FIG. 8 each disc-like element 160 may be disposed substantially perpendicular to the flow of the liquid solution within the housing 110, such as the elements 160 may substantially block any direct fluid flow through the housing 110 and as a result the fluid flow passes through the notches, grooves or apertures 310 in each of the discs. Due to the alternating arrangement of the apertures the fluid flow between the discs 160 is turbulent and by virtue of the differing cross-sectional areas of the apertures 310 in each disc 160, the width of the discs, and the space 170 between the discs 160 the fluid is caused to accelerate and decelerate on its passage through the housing 110 to ensure a turbulent flow over the surfaces of the discs 160. The nanobubble generator may be unidirectional and unipositional as shown by the arrows in FIGS. 3 and 8.

Australian Pat. Appl. No. 1987070484 discloses a water conditioner 10 depicted in FIGS. 1-2. The water conditioner 10 comprises adjacent discs 17 supported on a central rod 18. Each disc is formed with three apertures 21 which are together located to one side of the disc. The conditioner described in this patent is not a nanobubble generator because, unlike the notches of the disc-like elements of the present invention, the three apertures 21 of this Australian Pat. Appl. No. 1987070484 do not provide for a shear surface plane and shear edges necessary for creating nanobubbles. In addition, as illustrated in FIG. 1, the width of each disc 17 is substantially less than half the distance between adjacent discs.

c. Nanobubble-Containing Solution Producing System

The system of the present invention may be constructed in a variety of different embodiments and may be employed in connection with creating nanobubbles in liquid solutions.

The inventive nanobubble-containing liquid solution producing system may include a nanobubble generator of the present invention. In another embodiment, the system may include a source of liquid solution and a treatment module including a nanobubble generator of the present invention.

Polar and non-polar liquid, hydrophilic and lipophilic liquid solutions may be used as source liquid for the inventive system and treated to create nanobubbles in the source liquid to produce treated solution having a high concentration of nanobubbles. As such, the source may include oils, alcohols, water, solvents, fuels, surfactants, gels, carbohydrates, and so forth.

Figure 9:
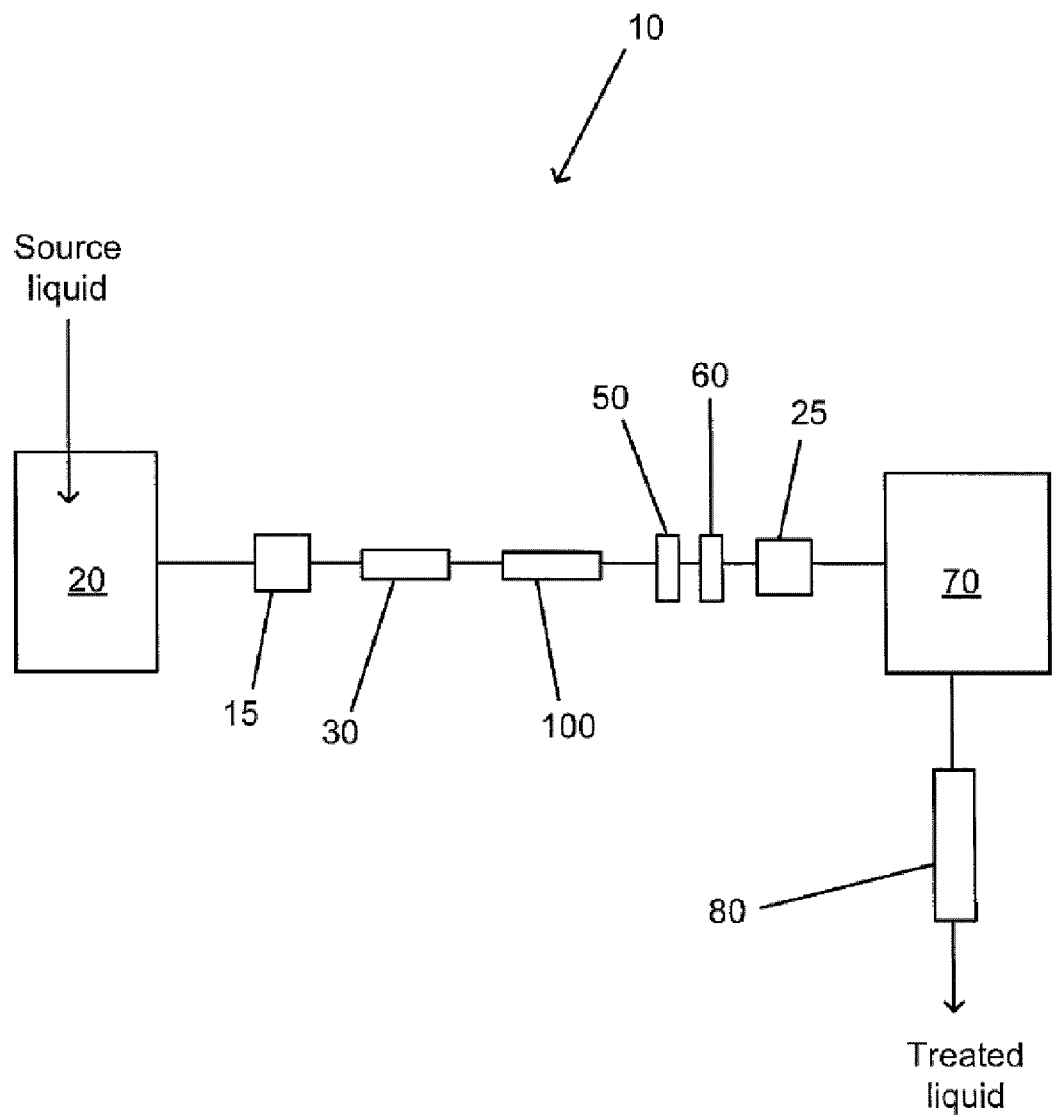
FIG. 9. An embodiment of the inventive system for generating nanobubbles.

FIG. 9 shows an embodiment of a system 10 for producing nanobubbles in a liquid source material. The system may include an optional source liquid pre-treatment system 15, a first nanobubble generator 30 of the present invention, an optional high zeta potential crystal generator 100, an optional pre-filtration system 50, an optional at least one filtration device 60, and an optional second nanobubble generator 80 of the present invention. Pre-treatment system 15, nanobubble generator 30, zeta potential shift crystal generator 100, pre-filtration system 50, filtration device 60, and second nanobubble generator 80 are in liquid communication with one another and are connected by way of a conduit system. The conduit system may include, for example, pipes, hoses, tubes, channels, and the like.

The source liquid solution, such as water or tap water, oils, alcohols and so forth, is supplied from any suitable source (for example a faucet) and the liquid may be stored in a reservoir 20, or may be supplied continuously or intermittently from any source. The composition of source liquid may be tested and, if necessary, additional minerals and other constituents may be added to provide a sufficient source for generation of nanobubbles. The source liquid may also be treated, prior or subsequent to holding in reservoir 20, in pre-treatment system 15 to substantially remove unwanted contaminants that may interfere with the treatment process, such as debris, oil-containing constituents, and the like.

Source liquid may be added continuously or intermittently to liquid reservoir 20. The liquid solution may flow through the nanobubble generator with enough force and pressure to initiate an endothermic reaction to create the nanobubbles with paramagnetic attributes. A pump may be used to generate said force and pressure. As such, the liquid solution may be actively pumped towards nanobubble generator of the system of the present invention. The liquid may also be released using a passive system, such as located in a plume to treat the water before a water turbine or propeller.

In another embodiment, the treated source liquid may next be passed through at least one filtration device 60. In a preferred embodiment, filtration device 60 reduces or substantially eliminates bacteria, viruses, cysts, and the like. Any filtration devices known in the art may be used. Filtration device 60 may include, but not limited to, particle filters, charcoal filters, reverse osmosis filters, active carbon filters, ceramic carbon filters, distiller filters, ionized filters, ion exchange filters, ultraviolet filters, back flush filters, magnetic filters, energetic filters, vortex filters, chemical oxidation filters, chemical addictive filters, Pi water filters, resin filters, membrane disc filters, microfiltration membrane filters, cellulose nitrate membrane filters, screen filters, sieve filters, or microporous filters, and combinations thereof. The treated and filtered liquid may be stored or distributed for use and consumption.

As shown in FIG. 9, before reaching the at least one filtration device 60, the treated liquid may optionally be passed through a zeta potential crystal generator 100. High zeta potential crystal generators are known in the art and generally useful for prevention or reduction of scaling. One known high zeta potential crystal generator 100 is the Zeta Rod™ system. The Zeta Rod™ system increases zeta potential of crystals by electronically dispersing bacteria and mineral colloids in liquid systems, eliminating the threat of bio-fouling and scale and significantly reducing use of chemical additives. Colloids in liquid systems become components of the capacitor and receive a strong boost to their natural surface charge, altering double-layer conditions that govern particle interactions. Mineral scale formation is prevented as the Zeta Rod™ system stabilizes the dispersion of colloidal materials and suspended solids, preventing nucleation and attachment of scale to wetted surfaces. Bacteria remain dispersed in the bulk fluid rather than attaching to surfaces, and cannot absorb nutrition or replicate to form slime and create foul odors. Existing biofilm hydrates excessively, loses bonding strength and disperses. Also, biological fouling, biocorrosion, and scale formation are arrested by the Zeta Rod™ system.

Another known high zeta potential crystal generator 100 is the Sterling Water Anti-Scale Appliance manufactured by Sterling Water Systems, LLC, a subsidiary of Porta Via Water Company. As water passes through the Sterling Water Anti-Scale Appliance, an electrical current is discharged into the water, which decreases the water's surface tension and inhibits the formation of scale and hard water spots from appearing. The inhibition of scale formation is due to the increase of zeta potential of the treated water, which keeps mineral particles from coming in contact with one another.

As shown in FIG. 9, after passage through nanobubble generator 30 and the optional high zeta potential crystal generator 100, and before reaching the optional at least one filtration device 60, the treated liquid may optionally be passed through pre-filtration system 50, wherein minerals, such as iron, sulphur, manganese, and the like are substantially removed from the treated source liquid. Pre-filtration system 50 can be, for example, a stainless steel mesh filter. The treated and pre-filtered source liquid, is next passed through the optional at least one filtration device 60, wherein bacteria, viruses, cysts, and the like are substantially removed from the treated liquid.

In the embodiment shown in FIG. 9, pump 25 is provided downstream from nanobubble generator 30 and treated liquid is released and distributed intermittently or continuously for various liquid system applications. The pump may alternatively be provided upstream from nanobubble generator 30.

The treated liquid, now having a high concentration of nanobubbles, may be distributed to and stored in a storage container 70, such as a reservoir. In this embodiment, before distribution of the stored treated liquid, the stored liquid may be passed through a second nanobubble generator 80, for generation of additional nanobubbles in the treated source liquid. The twice treated liquid may then be distributed for use and consumption. It should be understood that the system may include more than 2 nanobubble generators, as such the trice or more times treated liquid may be then be distributed for consumption.

Figure 10:
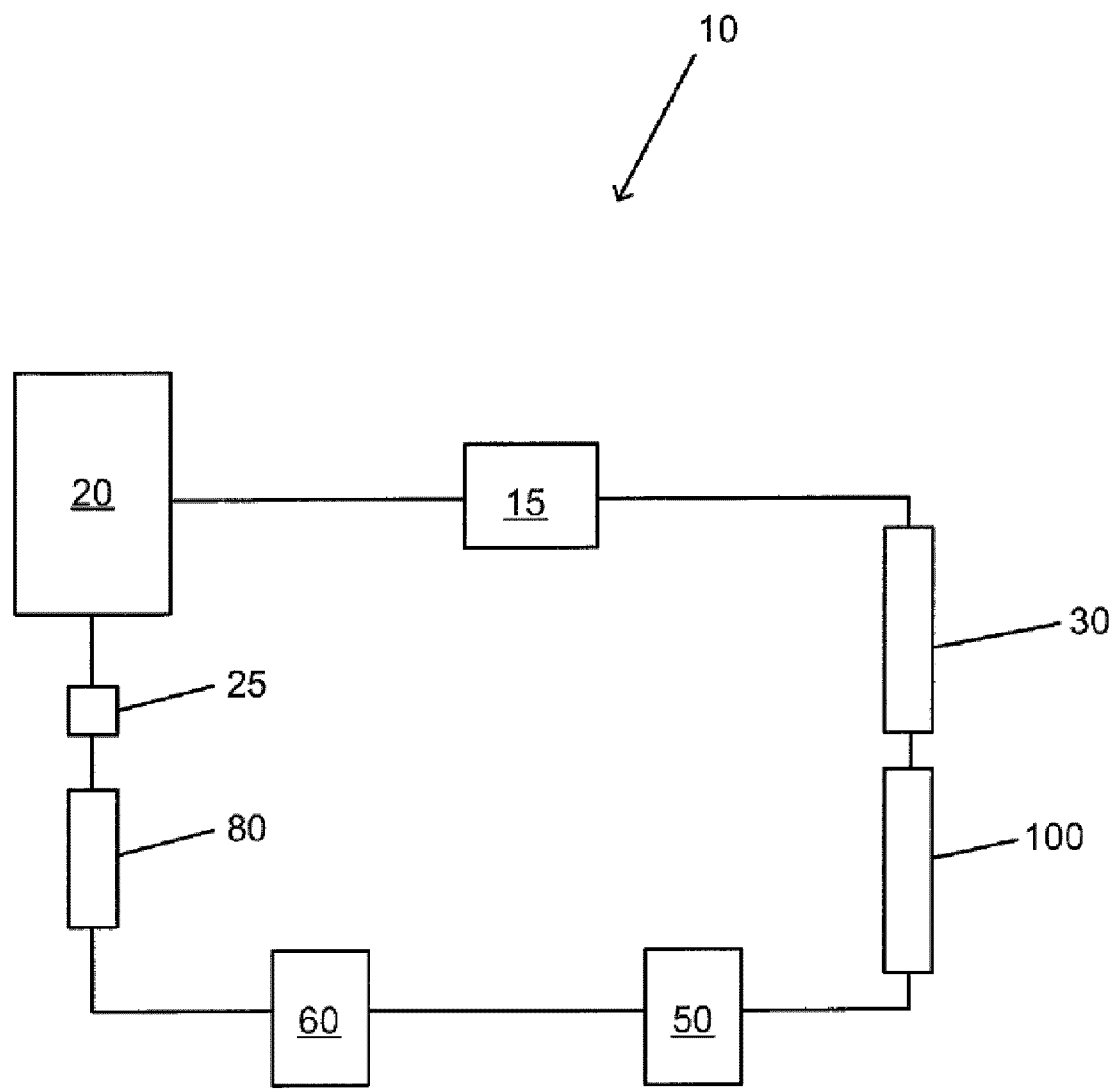
FIG. 10. An embodiment of the inventive system for generating nanobubbles.
Figure 11:
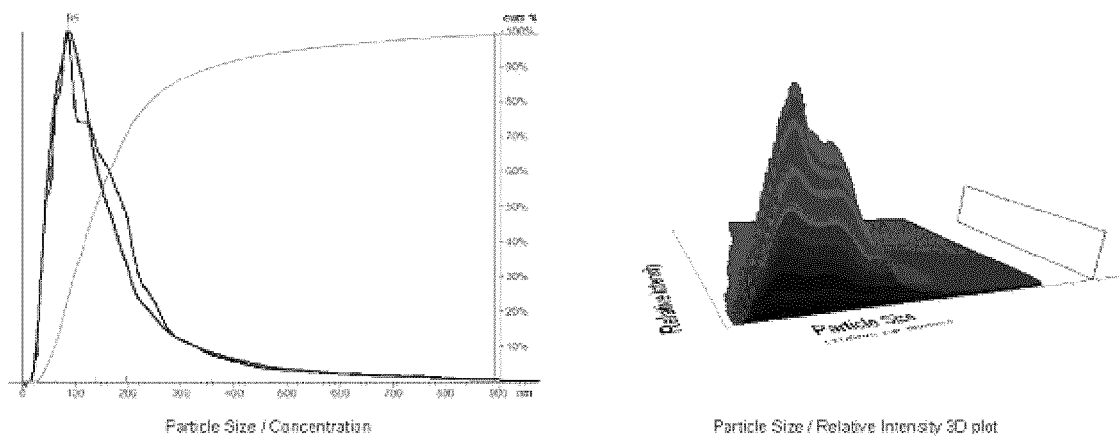
FIG. 11. Shows results of a Nanoparticle Tracking Analysis (NTA) of a raw water sample to determine the concentration and size of nanobbbubles in the raw water sample.
Figure 12:
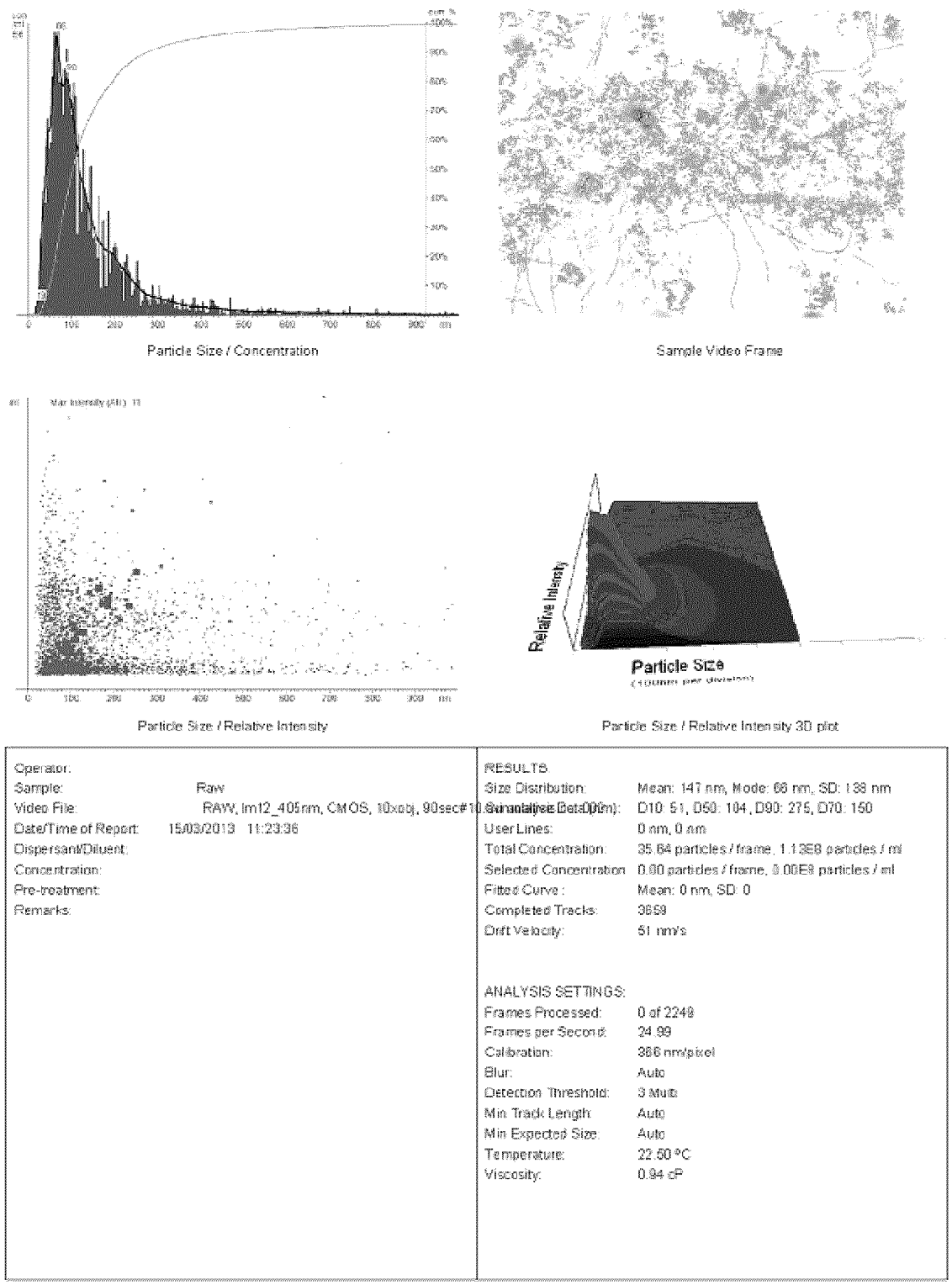
FIG. 12. Shows results of a NTA of a raw water sample to determine the concentration and size of nanobbbubles in the raw water sample.
Figure 13:
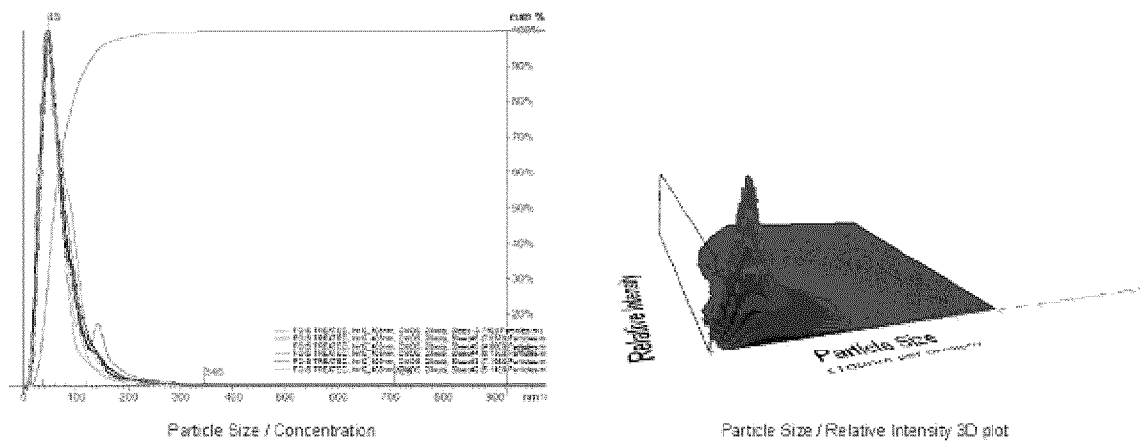
FIG. 13. Shows results of a NTA of a nanobubble generator-treated water sample to determine the concentration and size of nanobbbubles in the treated water sample.
Figure 14:
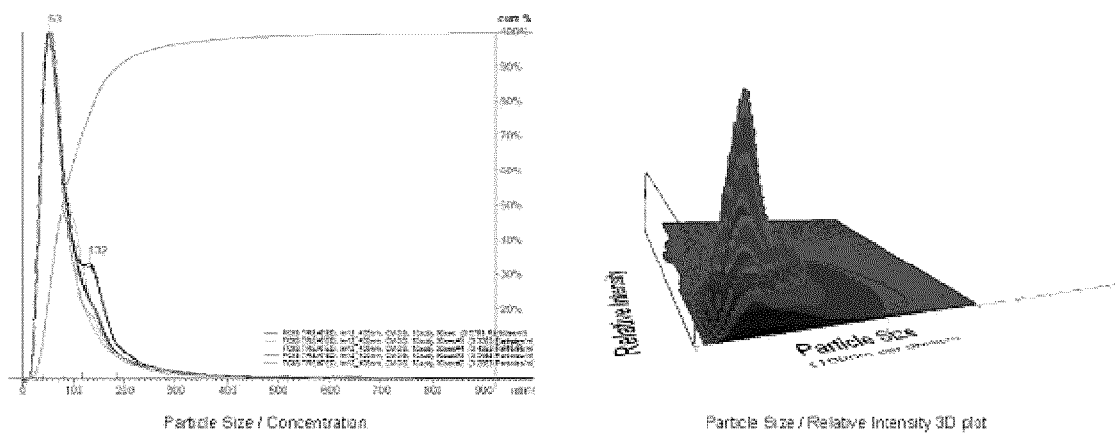
FIG. 14. Shows results of a NTA of a nanobubble generator-treated water sample to determine the concentration and size of nanobbbubles in the treated water sample.

FIG. 10 illustrates still another embodiment of the inventive system 10. The system 10 comprises a source reservoir 20 that houses the source liquid, an optional source liquid pre-treatment system 15, a first nanobubble generator 30, an optional high zeta potential crystal generator 100, an optional pre-filtration system 50, an optional at least one filtration device 60, and an optional second nanobubble 80. Pre-treatment system 15, nanobubble generator 30, high zeta potential crystal generator 100, pre-filtration system 50, filtration device 60, and second nanobubble generator 80 are in liquid communication with one another and are connected by way of a circulating conduit system. Examples of source reservoir 20 may include, but are not limited to, steam boilers, water heaters, cooling towers, drinking water tanks, pools, contained aquaculture ponds, aquariums, industrial water supply reservoirs, garden ponds, and the like. Source liquid may be stored or added continuously or intermittently to source reservoir 20, and the source liquid may be released using a passive system as previously described, or pumped, towards nanobubble generator 30, where nanobubbles are generated. Alternatively, the source liquid may be treated, prior or subsequent to holding in source reservoir 20, in pre-treatment system 15 to remove unwanted contaminants that may interfere with the treatment process, such as debris and oil-containing constituents.

In the embodiment shown in FIG. 10, source liquid stored in source reservoir 20, pre-treatment system 15, nanobubble generator 30, high zeta potential crystal generator 100, pre-filtration system 50, filtration device 60, second nanobubble generator 80, and pump 25 are connected in a loop-like manner by conduit system. Exemplary conduit systems may include, but are not limited to, pipes, hoses, tubes, channels, and the like, and may be exposed to the atmosphere or enclosed. This circulatory or loop-type connection provides continuous or intermittent circulation of the source liquid through source reservoir 20, pre-treatment system 15, nanobubble generator 30, high zeta potential crystal generator 100, pre-filtration system 50, filtration device 60, and second nanobubble generator 80.

Continuous or intermittent treatment of the source liquid by nanobubble generator system of the present invention eventually arrives at a point in time where the entire volume of the source liquid within the system 10 is treated by a nanobubble generator 30, 80. In other words, the entire inventive system 10 may eventually come to an equilibrium-like state, where the entire volume of the liquid within the system 10 is treated to generate nanobubbles. Microbubbles tend to coalesce to form large buoyant bubbles which either float away or collapse under intense surface tension-derived pressure to the point that they vanish, as predicted by theory. However, the nanobubbles generated by a nanobubble generator 30, 80 generally remain in suspension as the gases within them do not diffuse out.

Before passing through the optional filtration device 60, the treated liquid, containing a high concentration of nanobubbles, may optionally be passed through high zeta potential crystal generator 100 for generating high zeta potential crystals to substantially remove minerals that can cause the formation of scale.

Treated liquid, after passage through nanobubble generator 30 and the optional high zeta potential crystal generator 100, may optionally be passed through pre-filtration system 50, wherein minerals, such as iron, sulphur, manganese, and the like are substantially removed from the treated source liquid.

In an alternative embodiment, as shown in FIG. 10, after passage through the optional filtration device 60, treated liquid may be passed through an optional second nanobubble generator 80 for generating additional nanobubbles. In this embodiment, the continuous and intermittent treatment of the source liquid by the first nanobubble generator 30 and second nanobubble generator 80 eventually arrives at a point in time where the entire volume of the source liquid within the system 10 is treated by first nanobubble generator 30 and second nanobubble generator 80.

More than two nanobubble generators may be included in a system. For example, systems having a third nanobubble generator have been installed. However, systems with 4, 5 or more nanobubble generators may be made without difficulty.

c. Method of Producing a Nanobubble-Containing Solution

In one embodiment, the present invention relates to a nanobubble-containing solution producing method. The method, in one embodiment, may include passing a source liquid solution through a nanobubble generator of the present invention thereby producing the nanobubble-containing solution. The nanobubble containing solution produced with the methods and systems of the present invention may include a substantially high concentration of nanobubbles, or an enhanced concentration of nanobubbles and the nanobubbles may be stable.

In one step of the method, a source liquid solution may be passed through the generator which may initiate an endothermic reaction. The source liquid may be passed at a suitable pressure. The suitable pressure for the systems shown in FIGS. 9-10 may be about 3.2 bar. The pressure may be about 4 bar and the maximum pressure may be approximately 8 bar.

The endothermic reaction, in which the water cools down from between 2 to 4 degrees Celsius upon first treatment, is indicative of an energy conversion within the water body itself.

The critical material for the elements may be manufactured from a single metal, preferably corrosion resistant metal—for example stainless steel 300 series. The critical ions it produces, through the shearing action on water as it passes over the elements/discs 160, then act as catalysts in creating the endothermic reaction.

The reaction may be initiated by the energy of the water flow at a critical pressure over the series of elements within the generator. There may be at least two elements in a nanobubble generator. In one embodiment, there may be a total of 21 elements in a small generator and 25 elements in a larger generator. More than 25 elements may also be possible.

Each element within the generator may act as a shear plane and may be positioned substantially perpendicular to the liquid solution flow in order that the entire surface of the shear plane is utilized.

The spacing between the elements in the generator may also be adjusted to ensure that there is a suitable degree of cavitation. In one embodiment, the space between two adjacent discs is about 2 times the width of the discs.

With reference to FIG. 8, as liquid (represented by the broad arrows in FIG. 8) enters into the cavitation zone or chamber 190, a number of reactions may be taking place substantially simultaneously, including: cavitation, electrolysis, nanobubble formation, and a re-organization of the water liquid structure.

As liquid solution flows through the nanobubble generator the simultaneous reactions referred to before, may be replicated sequentially according to the formula n−1 times, wherein "n" is the number of disc-like elements 160 within the housing 110, to increase the kinetic energy frequency of the solution.

The resultant nano-bubble containing liquid solution of the present invention has increased paramagnetic qualities that may influence everything the water is subsequently used for, or used in. It may alter cleaning properties, steam and ice production, thermal transfer and even the energy needed to pump water. It may reduce scaling, biofilm and biofouling and may alter the way in which water interacts with oils and fats.

The method of the present invention changes important properties such as oxidation-reduction potential (ORP). By increasing the ORP beyond the capability of existing chemical concentrations method of the present invention substantially enhances the efficacy of sanitizers. The systems and methods of the present invention may increase ORP in excess of about 650 mV, enough for killing planktonic organisms instantaneously. The systems and methods of the present invention may deliver ORP greater and 700 mV with relatively small amounts of sodium hypochlorite (see Tables 1 and 2).

TABLE 1

Effect of 20 ppm of Sodium Hypochlorite/city water against several bacteria

| Culture | Sanitizer PPM | Orginal Count (cfu/ml) | Count after 15 minutes (cft/ml) |
|---|---|---|---|
| Psuedomonas sp. | 20 | 12,000 | <1 |
| Enterococcus sp. | 20 | 17,000 | <1 |
| Salmonella sp. | 20 | 11,000 | <1 |

TABLE 2

Effect of 5 ppm of Sodium Hypochlorite/Nanobubble-containing water against several bacteria

| Culture | Sanitizer PPM | Orginal Count (cfu/ml) | Count after 15 minutes (cft/ml) |
|---|---|---|---|
| Psuedomonas sp. | 5 | 12,000 | <1 |
| Enterococcus sp. | 5 | 17,000 | <1 |
| Salmonella sp. | 5 | 11,000 | <1 |

Research has shown that at an ORP value of 650-700 mV, free-floating decay and spoilage bacteria as well as pathogenic bacteria such as *E. coli* 0157:H7 or *Salmonella* species are killed within 30 seconds. Spoilage yeast and the more-sensitive types of spore-forming fungi are also killed at this level after a contact time of a few minutes or less.

The WHO (World Health Organization) adopted an ORP standard for drinking water disinfection of 650 mV. When the ORP in a body of water measures 650/1000 mV, the sanitizer in the water is active enough to destroy harmful organisms almost instantaneously.

Nano bubbles of the present invention may condition surfaces via a nano-gaseous barrier. This nano-gaseous barrier may serve to deter biofilm attachment to surfaces. The combination of the effects above creates a sanitized surface/system.

The method of the present invention may also positively impact pH and increase the solubility effects of water. Only water pressure may be needed for operation.

e. The Nanobubbles-Containing Liquid Solution

The nanobubbles produced after passage of source liquid solution through the nanobubble generator of the inventive system are of a different size and properties than the small-sized bubbles present in untreated liquid sources or in the treated liquids of the prior art.

The nanobubble-containing liquid solutions of the present invention are paramagenetic, as attested by Table 3, have an ORP that is higher than the ORP of the source, untreated, liquid solution, and may have a substantially large or high concentration of nanobubbles (see FIGS. 11-14).

The nanobubbles of the nanobubble-containing liquid solutions of present invention may be sized between about 10 and about 2000 nanometers and any range there in between. For example, the nanobubbles of the nanobubble-containing liquid solutions of present invention may be sized between about 10-1000 nm; between about 10-900 nm; between about 10-850 nm; between about 10-800 nm; between about 10-750 nm; between about 10-700 nm; between about 10-650 nm; between about 10-600 nm; between about 10-550 nm; between about 10-500 nm; between about 10-450 nm; between about 10-400 nm; between about 10-350 nm; between about 10-300 nm; between about 10-250 nm; between about 10-200 nm; between about 10-150 nm; between about 10-100 nm; between about 10-90 nm between about 10-80 nm; between about 10-70 nm; between about 10-60 nm; between about 10-50 nm; between about 10-40 nm; between about 10-30 nm; and between about 10-20 nm.

In one embodiment, the nanobubbles of the nanobubble-containing liquid solutions of present invention may have a mean size of under about 100 nm. In another embodiment, the nanobubbles of the nanobubble-containing liquid solutions of present invention may have a mean size of under about 75 nm.

In one embodiment, the nanobubbles of the nanobubble-containing liquid solutions of present invention may have a mode size of under about 60 nm. In another embodiment, the nanobubbles of the nanobubble-containing liquid solutions of present invention may have a mean size of under about 50 nm.

Treated liquid, after passage through nanobubble generator, contains a high concentration of nanobubbles. In one embodiment, the nanobubble concentration in liquid material following treatment in the nano-bubble generator system of the present invention may be between about 1.13 and 5.14 E8 particles/ml. In another embodiment, the concentration of nanoparticles may be between about 3.62 and 5.14 E8 particles/ml.

The nanobubbles generated by the nanobubble generators, systems and methods of the present invention are stable, do not settle readily and generally stay in suspension for a long period, even without agitation of the solution. The nanobubbles may stay in suspension from several hours to several years. The inventors have obtained stable colloidal dispersions that are over 5 years old and the nanobubbles are still viable and present. Based on the Brownian Motion Particle Theory, nanobubbles randomly drift and are suspended in fluids resulting from their collision by fast moving atoms or molecules in the liquid and not affected buoyancy.

f. Applications

The inventive nanobubble generator of the present invention and systems of the present invention may be used to eliminate bacteria and microorganisms and enhance the over quality of liquid in a number of liquid systems. These liquid systems, described in more details below, may include, but are not limited to, water heaters, water coolers, potable water systems, food processing settings, molecule purification, household water filtration systems, sanitation settings, water softeners, ion exchangers, and medical, dental, and industrial water supply lines, Steam Assisted Gravity Drainage (SAGD) and the like.

Water Heating Systems

The nanobubble generator of the present invention may be integrated with various water heating systems. It has been unexpectedly discovered that water treated by a water heating system provided with the nanobubble generator can eliminate bacteria and microorganisms in water, thereby improving the heat transfer efficiency of water heating systems. The liquid heating systems benefiting from the inventive system may include, but are not limited to, continuous water heaters, gas-fuelled hot water tank type heaters, electric hot water tank type heaters, re-circulating hot water systems for hot water tanks, continuous water heaters, district heating systems, in-floor heating systems, heat exchangers that utilities hot water and/or steam, or in combination with heat transfer liquids, such as hot oils natural or synthetic.

Water Cooling Systems

The nanobubble generator may be integrated with various water cooling systems. It has been unexpectedly discovered that water treated by a water cooling system provided with a nanobubble generator system, may eliminate bacteria and microorganisms in liquids, thereby improving the cooling transfer efficiency. The water cooling systems may include, but are not limited to, continuous water coolers, refrigerators, gas and electrically fired evaporators, cooling pads, wet film evaporators, evaporative cooling systems, ground source cooling systems, lake or river water cooling systems, heat exchange cooling systems for lakes, grounds, rivers, or ocean waters, district cooling systems, re-circulating cooling systems, in-floor cooling systems, cooling towers all types makes and models, vacuum applications for industrial cooling on boilers, sugar plant cooking pans, paper mills, petroleum refining plants, mining plants, power plants including: coal, gas, oil, biomass, and nuclear.

Potable Water Systems

The nanobubble generator may be integrated with various potable water systems. It has been discovered that water treated in system incorporating nanobubble generator, can eliminate bacteria and microorganisms in, and enhance quality of, water, thereby preventing the formation of biofilm in various piping systems, as well as improving the taste of water. The potable water systems may include, but are not limited to, wells, springs, ponds, lakes, rivers, and the like.

Food Processing Industry

It has been unexpectedly discovered that water treated by nanobubble generator of the present invention, can act as a disinfectant with the addition a minimal amount of chlorine (under 5 ppm) for storage of fresh produce. Since the treated water has been discovered to eliminate biofilm formation, food sanitation and production costs are lower and shelf life is lower. Further, since lower water surface tension increases solvency of the treated water, water treated in a system incorporating nanobubble generator, greatly increases the yield of oils from teas and coffees.

Sanitation Applications

Nanobubble generators can be integrated with sanitation systems such as swimming pools, power washers, car washes, household washing machines, commercial laundry facilities, household and commercial dishwashing facilities, and the like.

Water Treatment Applications

Nanobubble generators can be integrated with water treatment applications such as water softeners, ion exchangers, all membrane and filter systems that utilize chlorine, chlorine dioxide, hydrogen peroxide, ozone, and the like.

Medical Industry

Nanobubble generators can be integrated with medical systems and the systems are useful in applications related generally to skin treatments through bathing, spas, and daily usage, improved calcium uptake, improved teeth and conditions, as well as medical, dental, and industrial water lines.

Household Water Filtration Systems

Nanobubble generator system for use in the common household may be integrated with any filtration device known in the art as described above.

Devices Incorporating Generators, Systems and Methods of the Present Invention

It is obvious that methods, generators and systems of the present invention may be used in conjunction with or retrofitted in existing devices and liquid distribution systems, such as water heating systems including, but are not limited to, continuous water heaters, gas-fuelled hot water tank type heaters, electric hot water tank type heaters, re-circulating hot water systems for hot water tanks, continuous water heaters, district heating systems, in-floor heating systems, heat exchangers that utilities hot water and/or steam, or in combination with heat transfer liquids, such as hot oils natural or synthetic; water cooling systems including, but are not limited to, continuous water coolers, refrigerators, gas and electrically fired evaporators, cooling pads, wet film evaporators, evaporative cooling systems, ground source cooling systems, lake or river water cooling systems, heat exchange cooling systems for lakes, grounds, rivers, or ocean waters, district cooling systems, re-circulating cooling systems, in-floor cooling systems, cooling towers all types makes and models, vacuum applications for industrial cooling on boilers, sugar plant cooking pans, paper mills, petroleum refining plants, mining plants, power plants including: coal, gas, oil, biomass, and nuclear; potable water systems including, but are not limited to, wells, springs, ponds, lakes, rivers, and the like; food processing applications such as coffee and tea; sanitation systems including, but are not limited to, swimming pools, power washers, car washes, household washing machines, commercial laundry facilities, household dishwashers and commercial dishwashing facilities, and the like; water softeners; ion exchangers; all membrane and filter systems that utilize chlorine, chlorine dioxide, hydrogen peroxide, ozone, and the like; skin treatment systems through bathing, spas, and daily usage, improved calcium uptake, improved teeth and conditions; medical, dental, and industrial water lines; and any household water filtration systems.

Farms:

Animals provided with water treated with the generators of the present invention produced feces with less ammonia (ammonia was converted to organic nitrogen). Manure was changed stabilized and not producing methane or hydrogen sulfide. Application of nanobubble treated manure on crops showed the following: improved yield by over 12 percent with the same nitrogen inputs, mold resistance, strong root development, insect resistance, extremely low levels of microtoxins, field crops were more drought resistant and the water air interface allowed the plants to absorb moisture from the air, dairy products were aerobic and had a much longer shelf life, water was able to destroy *listeria* cocktails.

Water Based Paint:

Paint manufactured with nanobubble-containing solutions of the present invention display: faster drying times and had less volatile organic compounds, paint consumption due to better adhesion was reduced by 40 percent, paint demonstrated mold resistance, paint was brighter and dried smoother Beverage Plants:

Nanobubble water of the present invention replaced the need for CIP (clean in place) for over 1 year in a beverage facility bottle cooling tunnels, spraying treated water on conveyors also removed biofilm in a matter of days.

Poultry Processing Plants:

Using processed water with the nanobubble system of the present invention in scalders allowed for the reduction of temperature by 3 to 5 degrees Fahrenheit. Birds came out noticeable cleaner Using processed water in poultry chiller allowed birds to reach a 3 degree colder temperature with the same amount of refrigeration. Also the chemicals were more effective and there was a dramatic reduction in pathogen counts to zero counts and one false negative over a 51 day trial at St. Mary's Maple Leaf plant Removal of Heavy Metals from Protein Powders:

Nanobubble-containing water of the present invention separates on contact heavy metals from proteins such as iron, lead, manganese, arsenic and others. The reaction is substantially instantaneous and can be used in either a clarifier or a centrifugal separator. The protein when added into a drink, is naturally encapsulated by the nanobubble thus making it more shelf stable as a colloidal dispersion.

The resulting dried protein material when added to treated water methodology can be used for all dried beverage materials including, teas, coffees, fruit concentrates, medicines, pharmaceuticals, starches, sugars, chocolate mixes, all flavour mixes and all food products including ground meats.

As such, another embodiment of the present invention is a method of removing/separating heavy metals from a protein powder, the method comprising contacting the protein powder with a suitable nano-bubble-containing liquid like water, thereby removing/separating the heavy metals from the protein powder.

The method of removing/separating heavy metals from powder protein may also include presoaking ungrounded protein-containing material in a suitable nanobubble-containing liquid, like water, drying the presoaked material, grinding the protein-containing material, for example grinding the material to between a 70 and 100 mesh size, and re-washing the grounded protein-containing material in the nanobubble-containing liquid thereby separating the heavy metals from the grounded, protein-containing material. The method may also include spray drying the wet protein-containing material, regrinding the dried protein-containing material and re-washing the dried protein-containing material to separate finer heavy metals, spray drying the protein-containing material or using an alternative drying method. the protein obtained through the method hereby described will be substantially free of heavy metals. The heavy metals thereby separated may then be sold or used in other applications.

Ultra-Disinfection:

The nanobubble treated water of the present invention may prevent the formation and/or dissolve biofilm with or without the addition of chemicals.

Air Disinfection and Filtration:

The paramagnetic nanobubbles of the present invention that is present in the moisture in air caused an elimination of mold in buildings with the treated water of the present invention.

Ammonia in restrooms may be converted on contact in men's urinals to organic nitrogen therefore elimination the ammonia vapors.

Dust may be reduced including biofilm on all surfaces such as glass, wood, tile, metals.

Alcohol Manufacture:

Fermentation time of wines may be reduced by more than 50% with the use of water treated with the nanobubble generator of the present invention.

Less energy may be needed for production of ethanol and/or methanol. Production of ethanol may need up to about 17 percent less energy.

When nanobubble-containing water of the present invention is used in the dilution of alcohol it changes the chemical characteristics of the alcohol producing a finer smoother taste.

The nanobubble-containing liquid solution producing system of the present invention may be used to manufacture alcoholic beverages, including sake, vodka, scotch, rum, rye, gin, brandy, cognac, tequila, mezcal, wine, beers and so forth.

Ice Making:

A Vogt™ commercial ice maker made harder ice in a shorter time period. The machine made about 17 percent more ice.

Water Heating:

The water heats and dries with less energy at evaporates from surfaces up to about 30 percent faster.

Power Plant Applications:

In steam or thermal power plants improved efficiencies may be expected due to improved heat transfer, biofouling prevention of membranes and greater lubricity of the water.

Condensing of steam turbines using cooling water can be closed looped using cooling towers and also will be greatly increased for efficiency.

Marine Transportation:

Nanobubble-containing liquids of the present invention may reduce friction on a ships hull with our water.

Cleaning Devices:

The nanobubble generator of the present invention may be used in: power washers, car washes, laundry, carpet cleaning, steam cleaning, hot water cleaning.

Other applications include: injection of hydrogen gas into vegetable oils to reduce catalysis and to improve oil quality, use in bioreactors for methane production, elimination of ferric chloride in waste water due to aerobic condition of the waste water and a neutral ph of the waste water (currently this has been demonstrated in manure pits and is being validated in a food manufacturing facility. It has also been validated in the cooling tunnels with re-use water).

The nanobubble-containing solutions of the present invention may be used in the following goods:

1) In water and water-related goods, including: bottled water, carbonated water, cologne water, drinking water, effervescent water, flat water, flavoured water, glacial water, iceberg water, mineral water, sparkling water, toilet water, vitamin enhanced water, water beds, water for spas, baths, whirlpools and swimming pools, water for the use in livestock and pet feeding, water for use in irrigation of vegetables, plants, trees, crops, water for use in the manufacture of solvents, water for use in the manufacture of paints, water for use in the purification of proteins, and water for use in the manufacture of detergents.

2) In dairy products including milk, milk products, evaporated milk, protein-enriched milk, cocoa beverages with milk, milk beverages containing fruits, cheese, sour cream, powdered milk, butter, cream, cheese spreads, soy-based cheese substitute, dairy cream, whipping cream, ice-cream, ice cream makers, soy-based ice-cream substitute.

3) In alcohol beverages, including alcoholic cocktails, alcoholic coffee-based beverages, alcoholic coolers, alcoholic fruit drinks, alcoholic lemonade, alcoholic malt-based coolers, beers, alcoholic tea-based beverages, sake, vodka, scotch, rum, rye, gin, brandy, cognac, tequila, mezcal, wine.

4) In ice related products including ice, ice cube makers, ice packs, industrial ice.

5) In meats, including beef, pork, fish, poultry, frozen meat, smoked meat, canned meat.

6) In dental industry, including bubble-containing toothpaste, mouthwash, dental floss, dental gel, dental rinses, and denture cleaning preparations.

7) In the pharmaceutical/cosmetic industry, including eye washes, water for use in manufacturing cosmetics, water for use in manufacturing pharmaceuticals and medicinal products.

8) Steam, including steam generators, water for use in manufacturing steam, steam for use in extraction of oils from oil deposits, steam for use in Steam-assisted gravity drainage services.

9) Cleaning, including all purpose cleaning preparations, carpet cleaning preparations, water for steam sanitation and steam cleaning, water for sanitation, water-based paints.

10) Nanobubble-containing oils, including anti-rust oil, auxiliary fluids for use with abrasives for the oil well industry, baby oil, bath oil, vegetable, mineral and animal oils, catalysts for use in oil processing, chemical additives for oil well drilling fluid, cooking oil, drilling fluids for oil and gas wells, drilling mud for oil well drilling, edible oil, fuel oil, heating oil, high pressure water jetting system for the gas and oil industry, industrial oil, insulating oil for transformers, motor oil, motor oil additives, oil for use in the manufacture of candles, oil for use in the manufacture of cosmetics, oil for use in the manufacture of paints, rubbing oil for wood, petroleum jelly, diesel fuel, aviation fuel, fuel additives, and fuel for domestic heating.

11) Proteins, protein for use as a food additive, protein for use as a food filler, nutritional supplements, water-processed animal and plant protein.

The nano-bubble-containing liquid solutions of the present invention may preserve flavoring and essences for food. The encapsulation of flavors, fragrances and the like may serve to enhance or alter appearance of food and beverages. Used as a preservative, restore natural nutritional values through the addition of vitamins, minerals and proteins.

The nanobubble-containing liquid solutions of the present inventions may be used to clean and eliminate pollutants found in edible birds' nests, for example removal of feathers, fungi, nitrates, nitrites and so forth. The nanobubble-containing liquid solutions of the present inventions may make birds' nests more for manual removal of such contaminants while maintaining the original appearances of the nest and retain its nutrition and essences.

The nano-bubble-containing liquids of the present invention may also be used in process, including waste water treatment, water and sewer management, water treatment, food sanitation, carpet cleaning, cleaning of buildings, diaper cleaning, dry cleaning, fur cleaning, jewelry cleaning, leather cleaning, rug cleaning, window cleaning, pool cleaning, automobile (car, trucks, buses, bikes, motorbikes and so forth) washes, train washes, ship washes, airplane washes, oil and gas well treatment, oil refining, fuel treatment, and steam-assisted gravity drainage.

12) Gas Entrainment

Nanobubbles are stable to the bulk dissolution, countering the basis of fundamental of physics. The stability may be due to their nanoscopic size of the bubbles. The smaller in size, the more stable the bubble is, which extends the longevity of bubble and increases the contact time of the gas/liquid interface.

The fine bubbles in the millimeter size and nanobubbles above 250 nm may leave the system easily transferring only a small fraction of its cargo. With nanobubbles lower than 100 nm, the mass transfer rate is enormous (surface area per unit volume increases with diameter). Prior art systems average mean size range from 150-400 nm. The systems and methods of the present invention produce nanobubble-containing solution having mean size of under about 100 nm.

EXAMPLES

The examples are described for the purposes of illustration and are not intended to limit the scope of the invention.

Example 1

Spin-Echo (T2) Relaxation Measurements

Spin-echo (T2) relaxation measurements were made using an Acorn Area NMR device (XiGo Nanotools, Inc., Bethlehem, Pa. 18015, USA: U.S. Pat. No. 7,417,426 Aug. 26, 2008) of untreated water and water treated with nanobubble generators. Water samples were obtained from two locations: WB and JF. Five consecutive measurements were made on each of the samples.

Table 3 illustrates the results. While the data for the two treated water samples are less reproducible than the untreated control and source samples, it is clear that the two treated samples each have a statistically valid shorter T2 relaxation time compared with their sibling control/source samples.

It was noted: (a) the random variation in the 5 consecutive measurements made on each of the two untreated (control/source) water samples and the good repeatability (low std dev and cov), and (b) the progressive increase in T2 value for the 5 consecutive measurements made on each of the two WB treated water samples and the poorer repeatability (larger std dev and cov).

TABLE 3

Summary of T2 relaxation data for various samples of Water

| Sample | T2 (ms) |
| --- | --- |
| WB Control | 2372 (std. dev: 5.2; cov: 0.22%) |
| WB Treated | 2278 (std. dev: 26.3; cov: 1.1%) |
| JF Control | 2340 (std. dev: 6.1; cov: 0.26%) |
| JF treated | 2236 (std. dev: 22.2; cov: 0.99%) |

Example 2

Nanoparticle Tracking Analysis of Water Treated with Nanobubble Generator

The water used in this analysis was sourced from one chicken farm located in southwestern Ontario.

Water Treatment

Source water is pumped from a cistern. The pump includes a first nanobubble generator. Chlorine was injected into the source water and then passed through a second nanobubble generator.

The twice treated water then enters the contact tanks where iron, manganese, sulphur, and other toxic minerals are oxidized and removed using GreensandPlus™ media filters. Hydrocarbon filters were then used to filter out oils, glyphosates and organophosphates. HYDRAcap 60 Hydranautics Membrane was used to remove endotoxins, virus and bacteria. The twice treated water then is passed through a third nanobubble generator. Samples were collected from the pumped source water (i.e treated once through a nanobubble generator; referred to as "Raw" sample in FIGS. 6 and 7) and from the trice treated water (referred to as "Treated" sample in FIGS. 8 and 9).

Nanobubble Analysis

Nanoparticle Tracking Analysis (NTA) was used to obtain estimates of size, size distribution and concentration of nanoscale bubbles in the Raw and Treated samples (for a general review of the use of this technique in industry, see Bob Carr & Matthew Wright, "NanoSight Ltd Nanoparticle Tracking Analysis A Review of Applications and Usage 2010-2012", Chapter 6, 2013).

Reports were prepared for each of the samples analysed. Video clips of what the samples actually looked like were also obtained. Many of the samples contain very large particles which were probably many microns in diameter. Some of the particle populations were, however, quite small.

The magnification was changed in some circumstances to see lower numbers of larger particles. The file name indicates the wavelength of laser used (violet 405 nm), the type of camera (scientific CMOS), strength of microscope objective (×10 or ×20) and the length of the video.

In FIGS. 6-9, multi-plots are laid over each other in different colours for comparison but are of the same sample at any given time.

For the NTA, the samples were not filtered or spun (which one might have done normally, to lose the bigger, interfering, non-analysable stuff).

Each of the samples was analyzed at least 5 times to show variability between samples (which is simply a matter of statistical reproducibility—longer [or averaged]) analyses give more stable profiles of course.

It was noticed that some of the samples were contaminated by motile bacteria (those are the fast moving tracks which fly across the field of view and whose Brownian motion trajectories are long lines, not just random jitter.

Results

FIGs. and illustrate the NTA analysis of the Raw and Treated samples.

Raw samples show many large (pushing 0.5 μm) particles present. Smaller particles are fairly clean with relatively narrow distribution of sizes around 85-90 nm. Raw sample were contaminated with motile bacteria.

Treated sample is nicely monodisperse with clean population of nanobubbles at 50 nm. High concentrations of nanoparticles can be seen. The concentration of nanobubbles in the Raw samples were 1.54 E8 particles/ml and 1.13 E8 particles/ml. On the other hand, the concentration of nanoparticles in the Treated samples were measured at 5.14 E8 particles/ml and 3.62 E8 particles/ml.

The mean nanobubble size in the Raw samples were 147 nm and 190 nm, while in the Treated sample were 108 nm and as low as 72 nm.

The mode nanobubble size was 66 nm and 85 nm in the Raw samples, and 53/48 in the Treated samples.

The amount of nanobubbles in the Raw samples can be explained by the presence of a nanobubble generator in the pump.

Example 3

Conclusion for Examples 1 and 2

The systems and methods of the present invention result in nano-bubble-containing liquid solutions with improved physical, chemical and biological properties. The nanobubble generator results in a level of shear and eddy currents that produces a defined cavitation. This cavitation then creates a pressure differential sufficient to reach a critical, threshold activation energy. It is in exceeding this threshold energy level that the creation of nano-bubbles becomes effected. This is the crux of the present methodology that distinguishes it from traditional ultrasound, homogenizers, static mixers and the like.

The nano-bubbles of the present invention are paramagnetic. Indeed, the existence of paramagnetic nano-bubbles has been confirmed using nuclear magnetic resonance (NMR) spin-echo relaxation time measurements (see Table 3).

The nano-bubbles of the present invention, being between 50-100 nanometers and paramagnetic, change completely the physico-chemical properties of a liquid solution. For example, it has been observed that a substantial increase in the oxidation reduction potential of water treated with the nano-bubble generator according to the method of the present invention.

Example 4

Suppression of Poultry House Ammonia

Introduction

One of the most significant air quality challenges in poultry barns is ammonia ($NH_3$). Ammonia has detrimental effects on bird health, welfare and performance have been well documented. Birds excrete nitrogen (N) in the form of urinary waste product (uric acid) and as unutilized fecal protein waste. Approximately 50% of the N content of freshly excreted poultry manure is in the form of uric acid which is very quickly converted to $NH_3$ through multiple microbial processes. Compared to uric acid decomposition, fecal protein is converted more slowly through bacterial action. It is estimated that 50 to 80% of the N in manure is converted to $NH_3$ (Ritz, C. W., B. D. Fairchild and M. P. Lacy. 2004. Implications of ammonia production and emissions from commercial poultry facilities: A Review. J. Appl. Poult. Res. 13:684-692). Factors that influence microbial proliferation and the enzymatic steps in the breakdown of uric acid to $NH_3$ from broiler litter are temperature, pH, moisture, water activity and N content of the manure. Most uric acid breakdown is under aerobic conditions, although a small fraction is anaerobic as well (Groot Koerkamp, P. W. G. 1994. Review on emissions of ammonia from housing systems for laying hens in relation to sources, processes, building design and manure handling. J. Agric. Eng. Res. 59:73-87). Strategies to suppress the breakdown of nitrogenous compounds in litter have focused on minimizing key microbial and enzyme activity in the manure, lowering pH and reducing the N content in manure.

Objectives

1. Compare the performance of 0-20 day old broilers provided a water treated with the water treatment system of the present invention to the performance of 0-20 day old broilers provide untreated water.
2. Compare the ammonia concentration from manure of 0-20 day old broilers provided a water treated with the water treatment system of the present invention to the ammonia concentration in manure from 0-20 day old broilers provided untreated water.

Experimental Design

The experiments were carried out at the University of Maryland Eastern Shore. The study design was a Randomized Complete Block (RCB) design with 2 treatments and 8 replicates per treatment. An RCB design was used to eliminate the effect of cage location on bird performance. Each treatment was placed in a block (total of 8 blocks). At hatch, six male broilers (experimental unit) were placed per cage in a battery cage by treatment. The dependent variables measured were: feed efficiency, body weight gain, mortality, manure moisture, and manure ammonia.

Treatments

1. Control (untreated water; water was obtained from a municipal water source)
2. water treated with the nanobubble generator of the present invention.

Materials and Methods

ANIMALS: Chicks (Hubbard×Ross) were obtained from a local hatchery (Mountaire Farms). Six male chicks were randomly selected, weighed and assigned to treatments. One bird per pen was removed on day 14 to provide more space for the birds. The battery cage was placed in the UMES Environmental house. Each battery cage was equipped with a drinker, and a feeder. Feed and water was offered ad libitum. Feed consumption for each cage was collected. Drinkers were cleaned once per day and there was no cross contamination between the two water treatments. Mortality was recorded daily and standard operating procedures for the facility were followed. Temperature, ventilation, and lighting were similar to commercial conditions.

FEED: A standard starter diet that met or exceeded all National Research Council (1994) recommendations was provided to all pens for 0-20 days.

AMMONIA COLLECTION: Ammonia concentrations in the headspace of sealed buckets were measured on day 7, 14 and 20. Prior to each collection day (24-48 hours), clean trays were placed under each pen to allow for one to two days of manure accumulation. Manure was collected from each cage on each sample day; pooled and thoroughly mixed together. A subsample from each pooled manure sample (50 grams each on day 7; 400 grams on day 14 and 250 grams on day 20) was placed in sealed buckets. Ammonia dositubes were placed in each bucket to measure the total ppm of ammonia in the container headspace over a 22 hour period. Manure samples were collected on day 14 and day 20 for moisture analysis. Pooled manure samples by treatment were also collected on day 20 for nutrient analysis.

MANAGEMENT: Birds were placed in a starter battery. The battery was placed in the UMES Environmental House. Standard operating procedures for the facility were followed. Temperature, ventilation, and lighting were similar to commercial conditions.

Results

The results of this trial are provided in the tables below. There were no statistical differences in feed conversion ratio and average weight gain of birds provided the control water compared to the feed conversion ratio and average weight gain of birds provided the treated water (Tables 4 and 5). In addition, the percent mortality of the birds provided the treated water was similar to the percent mortality of the birds provided the control water. There were no statistical differences detected in the 14 day ammonia volatilization from feces of birds provided the control water compared to the 14 day ammonia levels from feces of birds provided the treated water. However, significant differences were detected on day 20 in the ammonia release from feces of birds provided the control water compared to the ammonia levels from feces of birds provided the treated water (1.3 vs. 0.67 ppm/hour, respectively). This was a 48% reduction in ammonia concentration. There was a numerical reduction in the percent moisture in the feces of birds provided treated water compared to the percent moisture in the feces of birds provided the control water (Table 6). Feces from birds provided treated water had 1.56% and 4.85% less moisture at 14 and 20 days of age, respectively. The difference at 20 days of age approached significance at the $P<0.05$ level. The differences observed in nutrient content of feces collected at 20 days of age (Table 8) will require further testing to validate its significance.

Discussion

Figure 15:
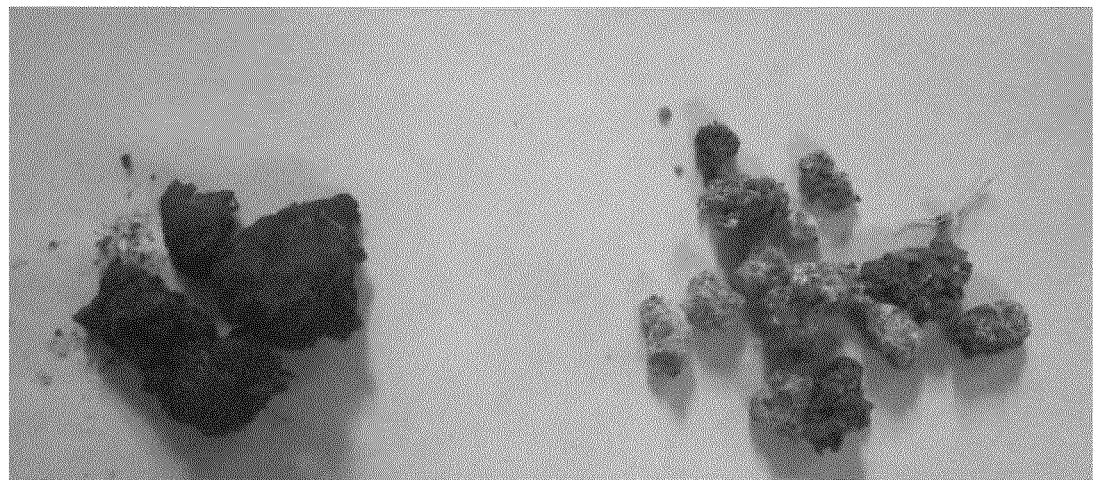
FIG. 15. Photograph illustrating the physical characteristics of stored fecal samples from broilers provided control and water treated with a nanobubble generator of the present invention.

Results from this preliminary evaluation of water treated with the nanobubble generator of the present invention would suggest the manure from broilers provided this water may have less moisture and ammonia volatilization. Stored fecal matter from birds provided the control water had a sticky, wet and a strong manure/ammonia smell, while stored feces from birds given the nanobubble generator treated water was granular, drier, and had an "earthy" aroma (see FIG. 15). There were no differences observed in performance of birds provided the treated water compared to those provided municipal water. However, it should be noted all birds in this study had no contact with their feces and had the same air quality. Additional controlled studies in commercial chicken houses under field conditions are warranted to validate the potential impact of this technology on broiler performance, health and welfare as well as air and litter quality.

TABLE 4

The feed conversion ratio (FCR[1]) of broilers (day 7, 14 and 20) provided two water treatments

| Treatment (n = 8) | FCR Day 0 to 7 | FCR Day 0 to 14 | FCR Day 0 to 20 |
| --- | --- | --- | --- |
| Control | 1.36 | 1.34 | 1.56 |
| Treated Water | 1.38 | 1.34 | 1.56 |
| | P− = 0.78 | P = 0.98 | P = 0.88 |

[1]Feed conversion ratio was corrected for mortality.

TABLE 5

The average weight gain of broilers (day 7, 14 and 20) provided two water treatments

| Treatment (n = 8) | Average Gain Day 0_7 (g) | Average Gain Day 0_14 (g) | Average Gain Day 0_20 (g) |
| --- | --- | --- | --- |
| Control | 117.8 | 386.4 | 657.6 |
| Treated water | 117.6 | 395.2 | 669.1 |
| | P− = 0.97 | P = 0.52 | P = 0.53 |

TABLE 6

The percent moisture of feces from broilers (day 14 and 20)[1] provided two water treatments

| Treatment (n = 8) | Percent Moisture Day 14 | Percent Moisture Day 20 |
|---|---|---|
| Control | 74.06 | 69.63 |
| Treated Water | 72.50 | 64.78 |
|  | P— = 0.18 | P = 0.06 |

[1]Moisture of feces was not determined on day 7

TABLE 7

The ammonia concentration (ppm/hour)[1] from feces collected from broilers (day 14 and 20) provided two water treatments

| Treatment (n = 8) | Ammonia concentration Day 14 (ppm/hour) | Ammonia Concentration Day 20 (ppm/hour) |
|---|---|---|
| Control | 3.05 | 1.30 |
| Treated Water | 1.80 | 0.67 |
|  | P = 0.14 | P = 0.03 |

[1]No ammonia was detected from any of the feces samples collected on day 7.

TABLE 8

The nutrient values[1] from feces collected from broilers (day 20) provided two water treatments

| Treat-ment | Or-ganic, N | Ammo-nium, N | Ni-trate, N | Total N | P2O5 | K20 | S | Ca | Na |
|---|---|---|---|---|---|---|---|---|---|
| Control[2] | 70.9 | 0.6 | 0 | 71.6 | 66.4 | 56.4 | 9 | 35 | 7 |
| Treated water[3] | 66.8 | 1 | 0.1 | 67.8 | 66.3 | 50.8 | 8.3 | 38.9 | 4.6 |

[1]Pounds per ton dry weight, basis.
[2]Pooled samples collected from eight treatment pens.
[3]Pooled samples collected from eight treatment pens.

Example 5

Evaluation of Treated Tap Water on Biofilm Control in a Laboratory-Scale Biofilm System Introduction
Biofilms Microorganisms (bacteria, fungi, and/or protozoa, with associated bacteriophages and other viruses) can grow collectively in adhesive polymers (mainly EPS) on biologic or non-biologic surfaces to form a biofilm. Biofilms are ubiquitous in natural and industrial environments, and it is now thought that biofilms are the primary habitat for many microorganisms as biofilm can protect microbes including human pathogens from harsh environments such as the presence of antibiotics and biocides (3, 4, 6). It is well known in the industrial world that biofilms routinely foul many surfaces including ship hulls, food processing systems, submerged oil platforms, and the interiors of pipeworks and cooling towers, causing corrosion and metal component failure. Biofilms in water purification systems can be responsible for a wide range of water quality and operational problems. Biofilms can be responsible for loss of disinfectant residuals, biofouling of membranes, microbial regrowth in treated water, and especially, biofilms can be a reservoir for pathogenic bacteria in the system (1, 5, 8). Therefore, biofilms have been associated with a wide range of problems both in industry and in medicine as it is very difficult to eradicate them with common practice.

Tremendous research has been focused on development of novel approaches to control biofilm development (i.e., prevent biofilm formation and eradicate establish biofilms. Surface modifications, chemical disinfectants and other physical and chemical methods have been developed and applied to control biofilm development in different environments but results are not satisfactory and some of these methods are not environmental friendly and has adverse impacts both on human health (2, 9). Novel effective and environmental friendly approaches for biofilm control are still in urgent need.

In this study, we present data on the effectiveness of nanobubble generator of the present invention in treated city tap water for controlling initial bacterial attachment and removing preformed biofilms in a laboratory testing system.

Materials and Methods
Bacterial Strains and Chemicals, and Nanobubble Processor

Two bacterial strains were used in this study. E. coli K-12 MG16653 was purchased from American Type Culture Collection. LB medium (broth and agar) was obtained from Fisher Scientific.

A nanobubble processor (1 inch in diameter) was obtained from Bauer Energy Design.

Water Treatment

A nanobubble processor was connected to a tap water faucet. Faucet was fully opened to allow tap water pass through the mixer (pressure: 40 psi and flow rate: 20 l/min). Treated water was collected 5 minutes after the treatment and stored in a 4 liter carboy up to seven days for later use. Tap water was also collected directly from the faucet and stored in a 4 liter carboy, which was used as a control.

Bacterial Attachment Assay

Sterile glass coverslips were immersed in 45 mm Petri dishes containing 20 ml of BED treated tap water or control tap water. Then Petri dishes were challenged with 10^6 cells/ml of E. coli cells and incubated for two hours at room temperature with gentle agitation. Then the coverslips were washed three times with MQ water, stained with Syto 9 and visualized with an epifluorescence microscope for attached bacterial cells.

Biofilm Development and Removal Assay

Figure 16:
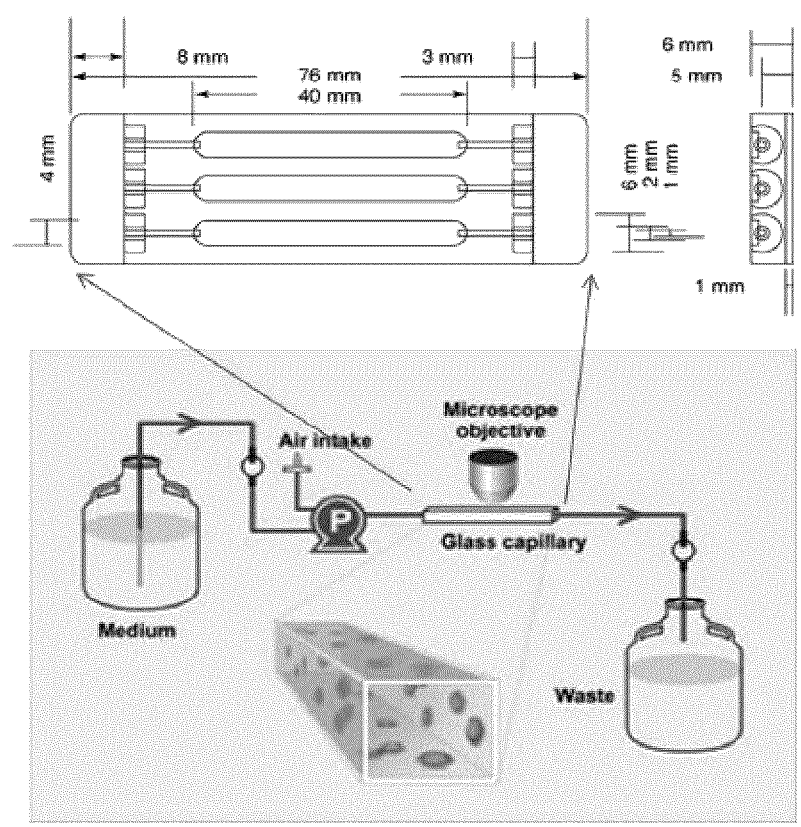
FIG. 16. Graph illustrating a glass capillary biofilm reactor system. Biofilms are grown under continuous-flow conditions. The glass tubes have a square cross section, allowing direct microscopic observation of biofilm growing on the inside of the tube. The apparatus consists of a vented medium feed carboy (4 liter capacity), a flow break, a filtered air entry, a peristaltic pump, the capillary and flow cell holder, an inoculation port, and a waste carboy. These components are connected by silicone rubber tubing.

All biofilms for the study were developed in a flow cell biofilm reactor with a setup similar to the one in FIG. 16. In FIG. 16, biofilms are grown under continuous-flow conditions. The glass tubes have a square cross section, allowing direct microscopic observation of biofilm growing on the inside of the tube. The apparatus consists of a vented medium feed carboy (4 liter capacity), a flow break, a filtered air entry, a peristaltic pump, the capillary and flow cell holder, an inoculation port, and a waste carboy. These components are connected by silicone rubber tubing. A three channel flow cell with #1 coverslip attached (each channel 4 mmW×40 mmL×1 mmD) (Stovall Life Science, Inc. Greensboro, N.C.) were assembled and prepared as described (7, 10).

To develop a mature biofilm, flow cell systems were conditioned by running 0.1 LB media for 2-3 hours. Media flow was paused for inoculation of bacterial cells (~2×10$^8$ CFU) and remained off for 1 h prior to resumption with a flow rate of 8 ml/hr. Biofilm development was performed at room temperature (20+/−1° C.) and biofilm formation in glass capillaries were monitored at pre-set time points up to 7 days.

To test initial bacterial attachment and biofilm formation from treated and control tap water, one channel in the flow cell system feed with fed with treated and control tap water, respectively, with a flow rate of 8 ml/hr. Bacterial colonization and biofilm formation in glass channels were monitored at pre-set time points up to 8 days. Treated and control tap water in the feed carboy was replaced on a daily basis.

For biofilm removal test, mature biofilms (4 days) in all three channels supplemented with 10% LB broth at a flow rate of 8 ml/hr were developed using the method described above. One channel was continuously feed with 10% LB broth, one channel with treated tap water and one channel with control tap water, respectively, with the same flow rate of 16 ml/hr. Biofilm were continuously monitored using a fluorescence microscope (IX71 Olympus, Center Valley, Pa.)

Biofilm Imaging

Observation of the biofilms and image acquisition were performed with a fluorescence microscope (IX71 Olympus, Center Valley, Pa.), a confocal scanning laser microscope (CSLM) (IX70 Olympus) or a camera (Canon PowerShot SD1100IS). At the end of biofilm removal test, PBS buffer (100 μL) containing 1 μM of SYTO 9 (Invitrogen, USA) was added into each channel and incubated for 15 min in the dark. Fluorescent images were acquired with an Olympus Fluoview™ FV1000 confocal microscope (Olympus, Markham, Ontario) with Melles Griot Laser supply and detectors and filter sets for monitoring SYTO 9. Images were obtained using an oil immersion 60× objective lens. Three-dimensional images were reconstructed using the Amira software package (Amira, San Diego, Calif.) from a stack of sectional images of biofilm samples.

Results

Effects on Initial Bacterial Attachment and Biofilm Formation

Figure 17:
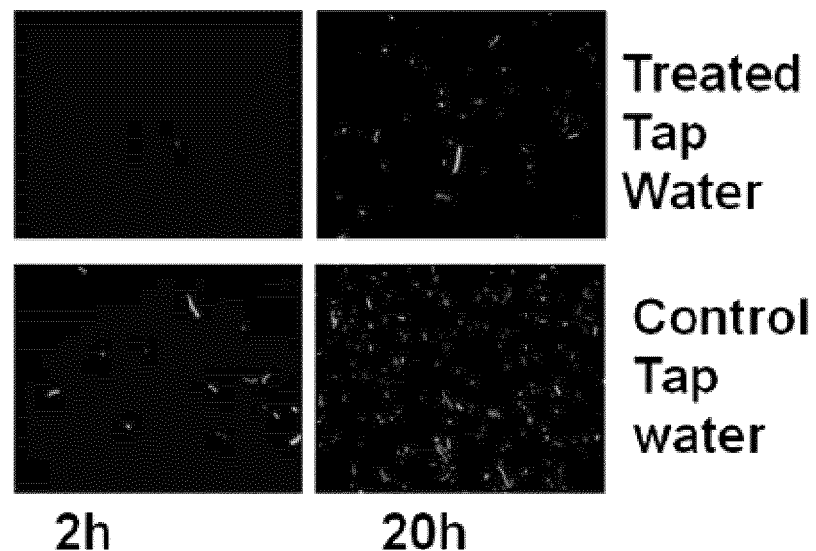
FIG. 17. Microphotographs of *E. coli* cells challenged into Petri dishes with glass cover slip immersed in the control tap water and the treated tap water and incubated for two hours. The coverslips were washed twice with MiniQ water, stained with Syto 9 and visualized with an epifluorescence microscope after 2 hours and after 20 hours.
Figure 18:
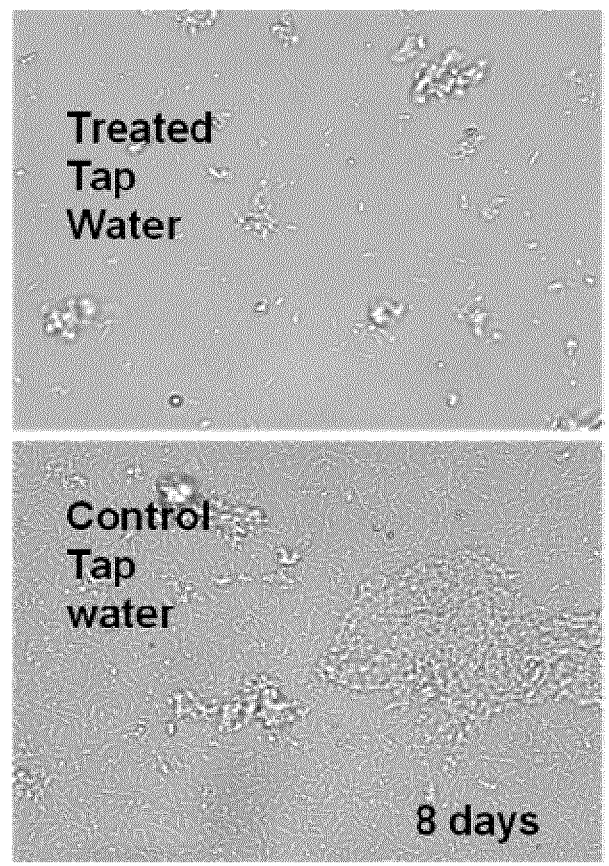
FIG. 18. Biofilm formation (8 days) in the flow cell by indigenous bacteria in treated tap water and control tap water.

The bacterial attachment assay indicated that the treated tap water inhibits initial bacterial attachment. No bacterial cells attached to the glass surfaces after 2-hour incubation in treated tap water; while cells started to attach to the glass surface in control tap water. Bacterial cells started to attach to the glass surface 20 hours after being incubated in treated tap water and on the glass surface in control tap water, small bacterial aggregates can be observed (FIG. 17). More than 75% reduction of initial bacterial attachment to the glass surface was achieved by the treated tap water.

Figure 19:
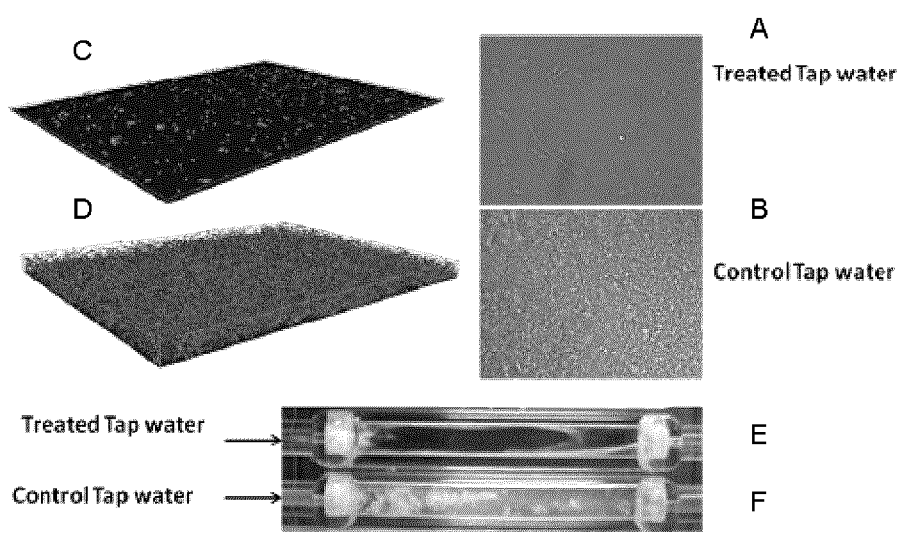
FIG. 19. Removal of preformed *E. coli* biofilms using a nanobubble-processor treated water. 6 days of *E. coli* biofilm formed in flow cells were rinsed with treated tap water (panel A) and control tap water (panel B) for 30 minutes. Panels C (treated water) and D (untreated water) are 3-D images showing the left biofilms on the surface. The dots indicate individual bacterial cells. Panels E (treated water) and F (untreated water) are photographs of the glass capillaries of the system of FIG. 16 fed with treated tap water (E) and untreated tap water (F).

The test on biofilm formation by the treated tap water and the controlled tap water in the flow cell system suggested that the nanobubble processor treated tap water inhibits biofilm formation. Eight days after being fed with treated tap water, small bacterial cell aggregates can be observed on the glass surface sparsely. While in the channel fed with control tap water, the entire glass surface was covered with bacterial cells and big bacterial cell microcolonies started to form (FIG. 19). By measuring the bacterial biomass, more than 80% reduction of biofilm formation was achieved.

Effects on Removal of Preformed Biofilms

After *E. coli* biofilms were developed in the multi-channels of a flow cell for 6 days, the treated tap water and the control tap water were fed into each channel separately. Thirty minutes after the treatment, the treated tap water removed most of biofilms developed in the channel, while the control tap water had little effect in removing biofilms (FIG. 19). By quantifying biofilm biomass left in the channel, more than 99% of biofilm biomass was removed by the treated tap water. Similar tests were done on removing biofilms developed by *Acineobacter baumannii* and *Pseudomonas aeruginosa* strains. Times that took to remove 99% of biofilm biomass ranged from 10 minutes to 5 hours in different tests (data not shown).

Conclusions

This study clearly demonstrated that the nanobubble processor treated tap water is effective in (1) inhibiting bacterial attachment to glass surfaces, which is an essential step for biofilm development; (2) inhibiting biofilm development; (3) removing preformed biofilms.

Initial tests done with water treated with the device described in Aus. Pat. No. on bacterial attachment and biofilm formation show that there is no significant improvement between treated and untreated water. Accordingly, the nanobubble generator of the present invention, which has been shown to inhibit bacterial attachment, inhibit biofilm development and remove preformed biofilms, constitute a clear improvement on the device of the prior art.

References for Example 5

Camper, A., M. Burr, B. Ellis, P. Butterfield, and C. Abernathy. 1999. Development and structure of drinking water biofilms and techniques for their study. JOURNAL OF APPLIED MICROBIOLOGY 85:1S-12S.
2. Chen, X. S., P. S. 2000. Biofilm removal caused by chemical treatments. Water Res 34:4229-4233.
3. Costerton, J. W., Z. Lewandowski, D. E. Caldwell, D. R. Korber, and H. M. Lappin-Scott. 1995. Microbial biofilms. Annu Rev Microbiol 49:711-45.
4. Hall-Stoodley, L., J. W. Costerton, and P. Stoodley. 2004. Bacterial biofilms: from the natural environment to infectious diseases. Nat Rev Microbiol 2:95-108.
5. Lechevallier, M. 2000. Biofilms in drinking water distribution systems: significance and control, Identifying future drinking water contaminants. The National Academy Press.
6. O'Toole, G., H. B. Kaplan, and R. Kolter. 2000. Biofilm formation as microbial development. Annu Rev Microbiol 54:49-79.
7. Stoodley, P., Z. Lewandowski, J. D. Boyle, and H. M. Lappin-Scott. 1999. The formation of migratory ripples in a mixed species bacterial biofilm growing in turbulent flow. Environ Microbiol 1:447-55.
8. Walker, J. T., S. L. Percival, and P. R. Hunter. 2000. Microbiological Aspects of Biofilms and Drinking Water CRC Press.
9. Wu, J., H. Xu, W. Tang, R. Kopelman, M. A. Philbert, and C. Xi. 2009. Evaluation of the Eradication of Bacteria in Suspension and Biofilms using Methylene Blue-loaded Dynamic NanoPlatforms. Antimicrob Agents Chemother 75:5390-95.
10. Xi, C., D. Marks, S. Schlachter, W. Luo, and S. A. Boppart. 2006. High-resolution three-dimensional imaging of biofilm development using optical coherence tomography. J Biomed Opt 11:34001.

The above disclosure generally describes the present invention. Changes in form and substitution of equivalents are contemplated as circumstances may suggest or render expedient. Although specific terms have been employed herein, such terms are intended in a descriptive sense and not for purposes of limitation. Other variations and modifications of the invention are possible. As such modifications or variations are believed to be within the sphere and scope of the invention as defined by the claims appended hereto.

What is claimed is:

1. A nanobubble generator comprising a housing having an inflow portion for receiving a single source liquid solution, a treatment portion for treating the single source liquid solution, and an outflow portion for releasing a treated liquid solution having nanobubbles, the treatment portion comprising at least ten sequential shear surface planes separated by cavitation spaces, wherein the treatment portion comprises at least ten equally sized disc-like elements mounted adjacent to each other on a shaft extending axially through the housing for continuously treating the single source liquid solution when the liquid solution is within the treatment portion, the disc-like elements being separated by a distance, the width of each disc-like element being about more than one half the distance between two consecutive disc-like elements;

wherein each disc-like element has a first shear wall facing the inflow portion, a second shear wall facing the outflow portion and a peripheral wall extending between the first and second shear walls, and wherein each disc-like element includes a notch or groove extending from the peripheral wall, the at least ten equally sized disc-like elements being mounted along the shaft with their notches or grooves circumferentially staggered in relation to one another; and wherein a scalloped shaped surface of the notch or groove provide for the sequential shear surface plane, and a space between the disc-like elements provide for the cavitation space.

2. The nanobubble generator of claim 1, wherein the nanobubble generator includes between 10 and 30 disc-like elements.

3. A method of producing a liquid solution having an enhanced concentration of nanobubbles, the method comprising:

(a) providing a nanobubble generator comprising an inflow portion for receiving a source liquid solution, a treatment portion for treating the source liquid solution, and an outflow portion for releasing a treated liquid solution having nanobubbles, the treatment portion comprising at least ten sequential shear planes separated by cavitation spaces, wherein the treatment portion comprises at least ten equally sized disc-like elements mounted on a shaft extending axially through the housing for continuously treating the single source liquid solution when the liquid solution is within the treatment portion, the disc-like elements being separated by a distance, the width of each disc-like element being about one half the distance between two consecutive disc-like elements; wherein each disc-like element has a first shear wall facing the inflow portion, a second shear wall facing the outflow portion and a peripheral wall extending between the first and second shear walls, and wherein each disc-like element includes a notch or groove extending from the peripheral wall, the at least ten equally sized disc-like elements being mounted along the shaft with their notches or grooves circumferentially staggered in relation to one another; and wherein a scalloped shaped surface of the notch or groove provide for the sequential shear surface plane, and a space between the disc-like elements provide for the cavitation space; and (b) passing the source liquid solution through the nanobubble generator, thereby producing the treated liquid solution having nanobubbles.

4. A method of enhancing the qualities of a material, the method comprising:

(a) passing a source liquid solution through a nanobubble generator of claim 1 thereby producing a treated liquid solution having nanobubbles; and (b) contacting the material with the treated liquid solution.

5. A method of removing or preventing the formation of biofilm on a surface, the method comprising:

(a) passing a source liquid solution through a nanobubble generator of claim 1 thereby producing a treated liquid solution having nanobubbles; and (b) contacting the surface with the treated liquid solution having nanobubbles.

6. A method of reducing the content of ammonia in manure of birds, the method comprising feeding the birds with a liquid solution having nanobubbles, wherein the liquid solution having nanobubbles is obtained by passing a source liquid solution through a nanobubble generator of claim 1.

7. A method of removing heavy metals from a material, the method comprising:

(a) passing a source liquid solution through a nanobubble generator of claim 1 thereby producing a treated liquid solution having nanobubbles; and (b) contacting the material with the treated liquid solution having nanobubbles.

8. The method of claim 3, wherein the nanobubbles in the nanobubble containing solution have a mean size of under about 100 nm.

9. The method of claim 3, wherein the nanobubbles in the nanobubble containing solution have a mode size of under about 50 nm.

10. The method of claim 3, wherein the nanobubble containing solution has an oxidation-reduction potential (ORP) relatively higher than the ORP of the source liquid solution used to produce the nanobubble-containing solution.

11. The method of claim 3, wherein the liquid solution is selected from a non-polar liquid solution, a polar liquid solution or a combination thereof.

12. The method of claim 3, wherein the source liquid solution is devoid of gases.

13. The method of claim 3, wherein the method is devoid of the use of external gases.

14. An apparatus or system for liquid treatment including a nanobubble generator of claim 1.

* * * * *